(12) United States Patent
Shimojo et al.

(10) Patent No.: US 7,203,586 B2
(45) Date of Patent: Apr. 10, 2007

(54) CONTROLLER FOR CONTACT MECHANISM

(75) Inventors: Kanako Shimojo, Wako (JP); Yuji Yasui, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 19 days.

(21) Appl. No.: 11/107,960

(22) Filed: Apr. 18, 2005

(65) Prior Publication Data
US 2005/0234625 A1    Oct. 20, 2005

(30) Foreign Application Priority Data
Apr. 20, 2004    (JP)    ............................. 2004-123754

(51) Int. Cl.
*G06F 17/00*    (2006.01)
(52) U.S. Cl. .................. 701/51; 701/58; 477/107; 74/335; 74/473.12
(58) Field of Classification Search ................ 701/58, 701/66, 55, 57, 97, 51; 477/109, 120, 78, 477/110, 107, 155; 74/335, 336 R, 473.12; 318/560
See application file for complete search history.

(56) References Cited

U.S. PATENT DOCUMENTS

| | | | | |
|---|---|---|---|---|
| 4,940,924 A | * | 7/1990 | Mizuno et al. | ............. 318/560 |
| 5,164,931 A | * | 11/1992 | Yamaguchi et al. | ..... 369/44.29 |
| 6,664,752 B2 | * | 12/2003 | Kanayama et al. | ......... 318/639 |
| 6,810,768 B2 | * | 11/2004 | Comfort et al. | ............... 74/582 |
| 2004/0145321 A1 | * | 7/2004 | Yasui et al. | .................. 318/135 |

FOREIGN PATENT DOCUMENTS

| | | |
|---|---|---|
| JP | 2002-195406 | 7/2002 |
| JP | 2004-252924 | 9/2004 |

* cited by examiner

*Primary Examiner*—Thomas Black
*Assistant Examiner*—Marie A Weiskopf
(74) *Attorney, Agent, or Firm*—Westerman, Hattori, Daniels & Adrian, LLP.

(57) ABSTRACT

A controller for a contact mechanism for preventing a lack of a pressing force applied from a contacting member to a contacted member when determining a control input to an actuator moving the contacting member by a position control. The controller sets a target position of the contacting member, grasps an actual position of the contacting member, determines a control input to the actuator (so as to increase an output of the actuator along with an increase in a difference between the target position and the actual position of the contacting member to eliminate the difference), and detects that the contacting member contacts the contacted member.

6 Claims, 12 Drawing Sheets

FIG. 4
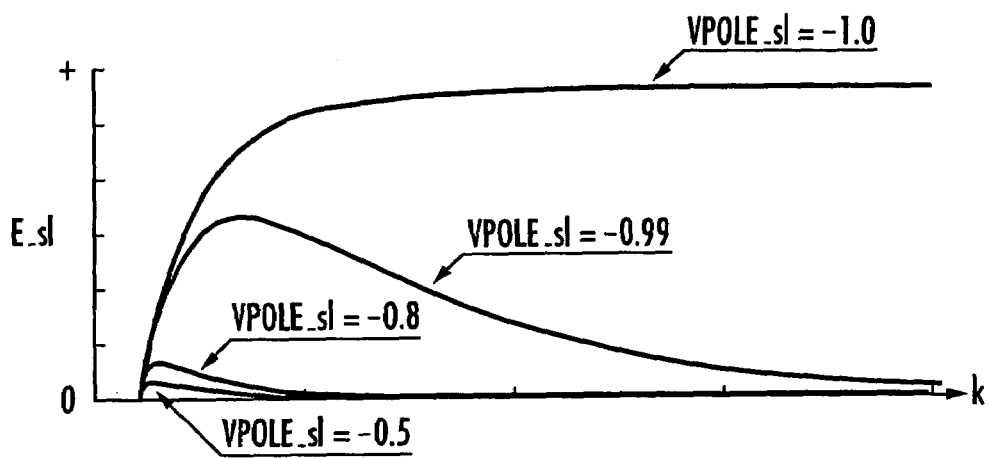
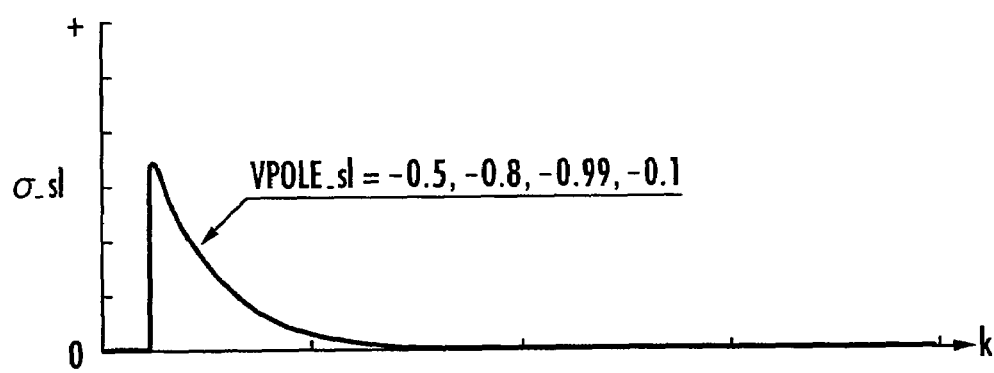
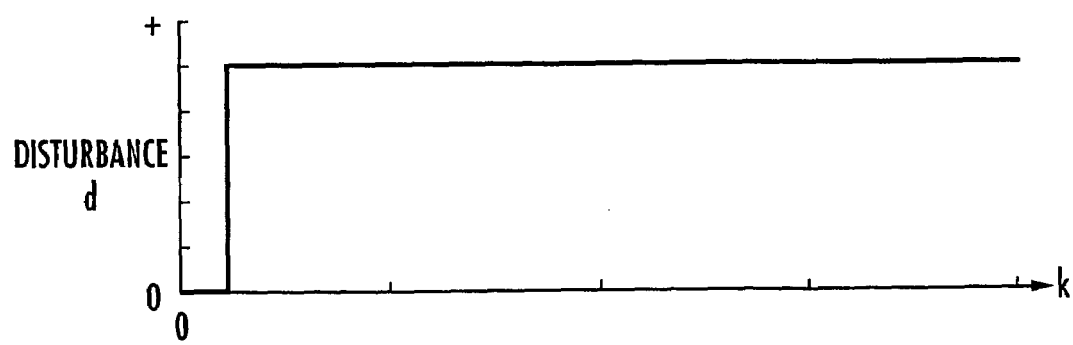

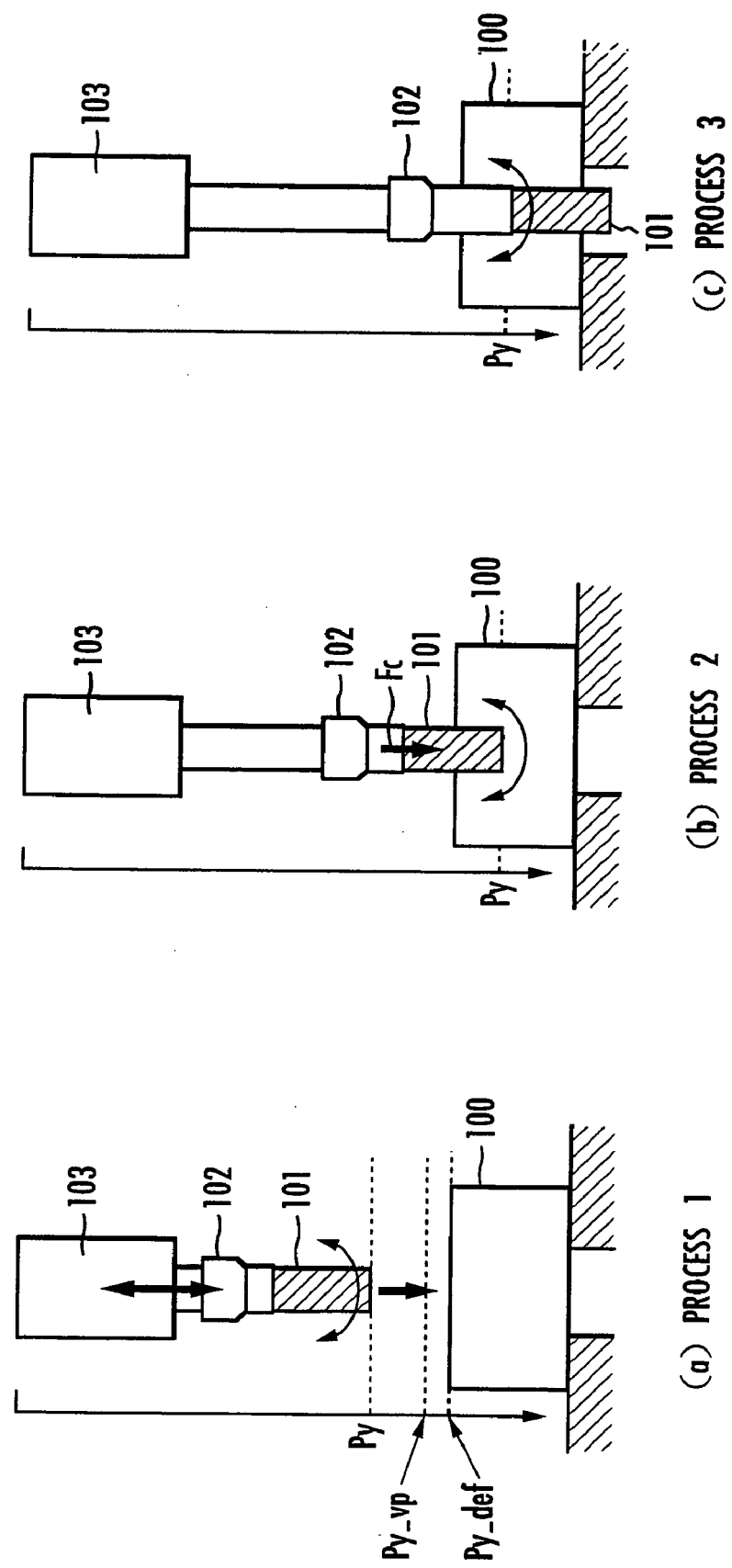

CONTROLLER FOR CONTACT MECHANISM

BACKGROUND OF THE INVENTION

1. Field of the Invention

The present invention relates to a controller for a contact mechanism for bringing a contacting member into contact with a contacted member by moving the contacting member using an actuator.

2. Related Background Art

There is an already known contact mechanism for bringing a contacting member into contact with a contacted member by moving the contacting member using an actuator such as, for example, an automatic/manual transmission (automatic MT), wherein a motor or some other actuator is used to perform a select operation and a shift operation of a manual transmission, in which a power transmission is conducted between an input shaft and an output shaft of a vehicle by means of a select operation and a shift operation with a driver's manual operation.

In the shift operation of the automatic MT, the number of revolutions of a coupling sleeve is synchronized with that of a synchronized gear by moving a coupling sleeve rotating integrally with the input shaft to bring it into contact with the synchronized gear via a synchronizer ring, before bringing about an engagement between the coupling sleeve and the synchronized gear.

Moreover, there is known a technique of providing a buffering mechanism between a coupling sleeve and a synchronizer ring to protect an automatic MT mechanism and to reduce the time required for the shift operation and thereby absorbing a shock mechanically when the coupling sleeve contacts the synchronizer ring (for example, refer to Japanese Laid-Open Patent Publication (Kokai) No. 2002-195406).

The inventor et al. of the present application have already suggested a controller for a contact mechanism for changing a pressing force applied from a contacting member to a contacted member by varying an operational coefficient in a response specification type control for determining a control input to an actuator according to a difference between a target position and an actual position of the contacting member when determining the control input to the actuator by means of a position control that causes a position of the contacting member to follow the target position, in the contact mechanism bringing the contacting member into contact with the contacted member by moving the contacting member using an actuator.

In this type of controller, the position control is conducted to determine the control input to the actuator according to the difference between the target position and the actual position of the contacting member so that the target position of the contacting member matches the actual position thereof. The inventor et al. of the present application found that, with a low reaction force of the contacted member at the time of the contact between the contacting member and the contacted member and a small difference between the target position and the actual position of the contacting member, an output of the actuator becomes low and it causes a lack of pressing force applied from the contacting member to the contacted member.

SUMMARY OF THE INVENTION

Therefore, it is an object of the present invention to provide a controller for a contact mechanism for preventing a lack of pressing force applied from a contacting member to a contacted member when determining a control input to an actuator for moving the contacting member with a position control.

The present invention has been provided to achieve the above object. According to one aspect of the present invention, there is provided a controller for a contact mechanism for performing a process of controlling an operation of the contact mechanism, which includes a contacting member provided so as to be movable in a one-axis direction, an actuator coupled to the contacting member and moving the contacting member, and a contacted member that contacts the contacting member when the contacting member moves to a predetermined position, in order to press the contacting member to the contacted member by moving the contacting member beyond the predetermined position by using the actuator.

The controller comprises target position setting means for setting a target position of the contacting member in the foregoing process; actual position grasping means for grasping an actual position of the contacting member; control input determination means for determining a control input to the actuator so as to increase an output of the actuator along with an increase in a difference between the target position and the actual position of the contacting member to eliminate the difference; and contact detecting means for detecting that the contacting member contacts the contacted member, wherein the target position setting means sets the target position of the contacting member so that the control input to the actuator matches a target control input that causes the pressing force applied from the contacting member to the contacted member to be at the predetermined level when the contact detecting means detects that the contacting member contacts the contacted member.

According to this aspect of the present invention, the target position setting means sets the target position of the contacting member so that the control input to the actuator is the target control input that causes the pressing force applied from the contacting member to the contacted member to be at the predetermined level when the contact detecting means detects that the contacting member contacts the contacted member. Therefore, if a reaction force of the contacted member is low when the contacting member contacts the contacted member and it is difficult to generate a large difference between the target position and the actual position of the contacting member, the target position of the contacting member is set so that the control input to the actuator is the target control input, thereby preventing a lack of pressing force applied from the contacting member to the contacted member.

Moreover, the target position setting means sets the target position of the contacting member by adding an offset value for increasing the difference to a pressing target position preset to a position beyond the predetermined position when the contact detecting means detects that the contacting member contacts the contacted member.

According to the above feature, the target position setting means sets the target position of the contacting member by adding the offset value to the pressing target position, thereby easily and immediately increasing the difference between the target position and the actual position of the contacting member. Moreover, this enables an immediate change of the control input to the actuator determined by the control input determination means in a direction to increase the output of the actuator, thereby increasing the pressing force applied from the contacting member to the contacted member in a short time.

Moreover, the actuator control means determines the control input to the actuator for each predetermined control cycle, and the controller for the contact mechanism includes offset value determination means for determining the offset value by using a response specification type control in which a damping behavior and a damping speed of a difference between a control input to the actuator in past control cycles and the control input depending on the target value of the pressing force applied from the contacting member to the contacted member.

According to the above feature, the offset value is determined by using the response specification type control, by which the target position of the contacting member can be set so as to generate a pressing force applied from the contacting member to the contacted member stably without an occurrence of an overshoot even in a situation where conditions at the contact between the contacting member and the contacted member vary as in a fluctuation in the reaction force of the contacted member at the time of contact. In addition, the contact mechanism can be prevented from being damaged by an excessive pressing force.

The target position setting means increases the difference by adding the offset value to the pressing target position until the actual position of the contacting member reaches a preset limiting position.

According to the above feature, it is possible to prevent the contacting member from being pressed into the contacted member beyond the limiting position and damaging the contact mechanism.

Furthermore, the contact mechanism is a synchronization mechanism for switching between transmission and disconnection of rotational power. The contacting member is a first engaging member provided so as to be integrally rotatable on a shaft, and the contacted member is a synchronization member arranged between a second engaging member relatively rotatable and not axially movable on the shaft and the first engaging member in such a way as to be freely rotatable with respect to the first engaging member and the second engaging member and movable in an axial direction thereof and enables an engagement between the first engaging member and the second engaging member by synchronizing revolutions between the first engaging member and the second engaging member by means of a frictional force generated at a contact between the first engaging member and the second engaging member with the shaft being rotating.

According to the above feature, it is possible to prevent a lack of pressing force of the first engaging member at the synchronization of the revolutions between the first engaging member and that of the second engaging member via the synchronization member, thereby insuring the engagement between the first engaging member and the second engaging member.

BRIEF DESCRIPTION OF THE DRAWINGS

FIG. 4 is a graph illustrating changes in disturbance-control capabilities caused by changing a response specification parameter.

FIG. 12 is an example where the present invention is applied to a machine tool.

DETAILED DESCRIPTION OF THE PREFERRED EMBODIMENTS

Figure 1:
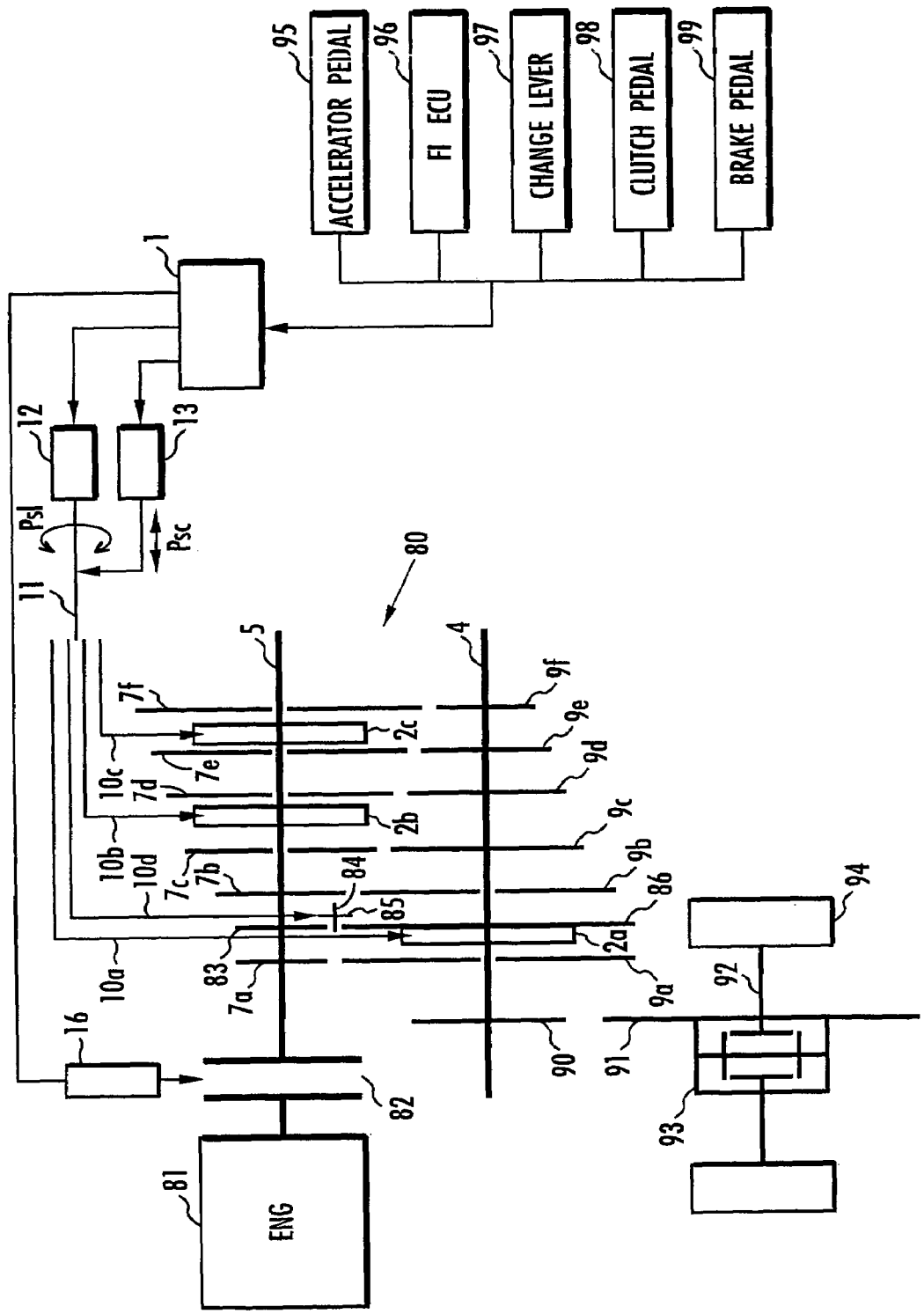
FIG. 1 is a schematic diagram of a transmission including a contact mechanism according to the present invention.
Figure 2:
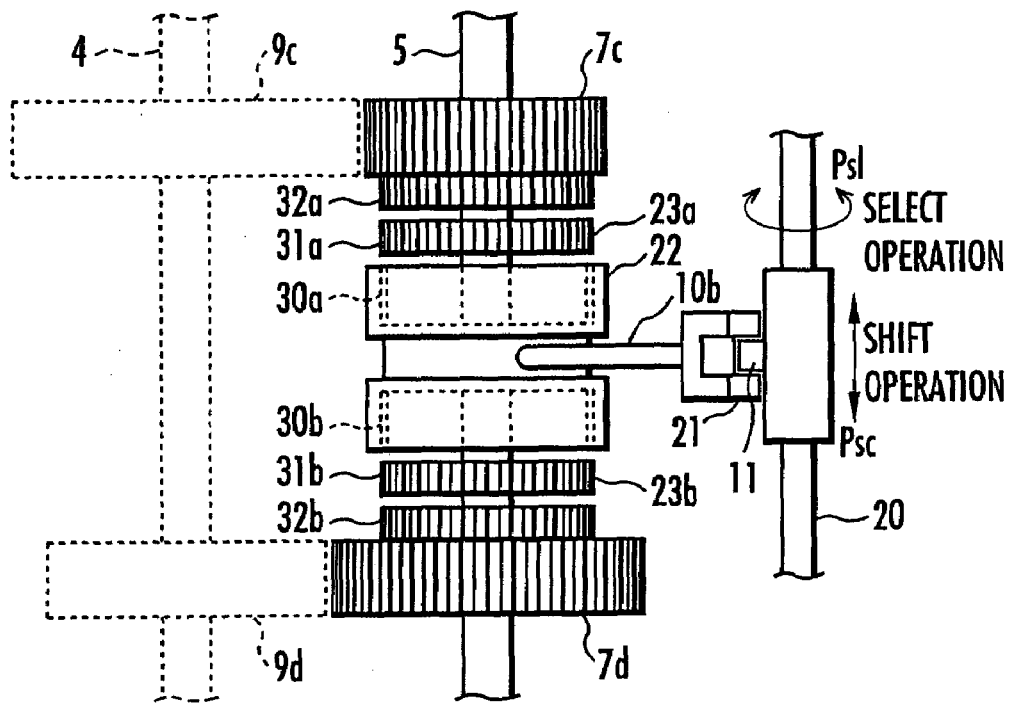
FIG. 2 is a detail view of a shift/select mechanism of the transmission shown in FIG. 1.
Figure 2:
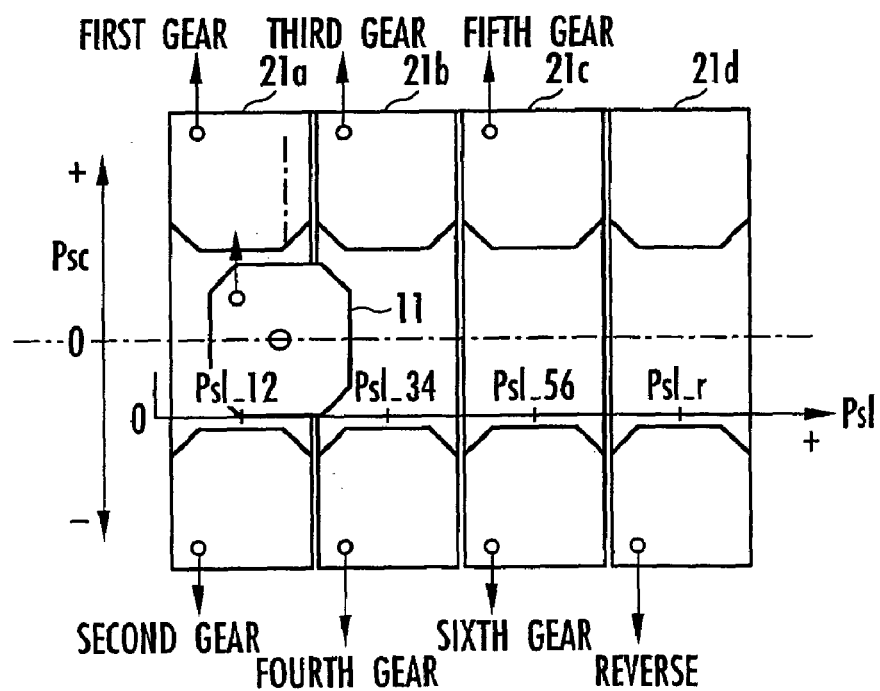
Figure 3:
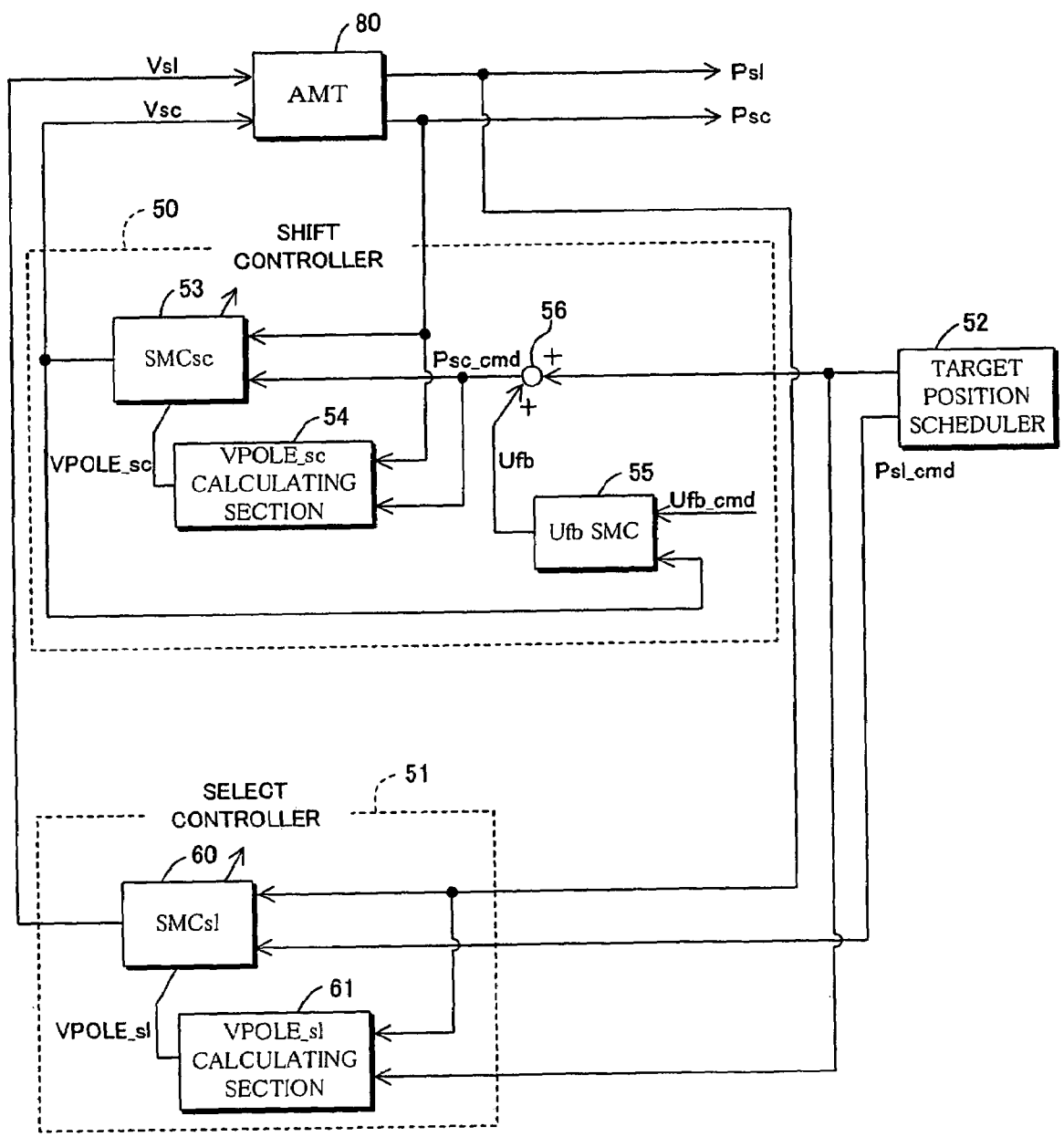
FIG. 3 is a schematic diagram of a controller shown in FIG. 1.
Figure 5:
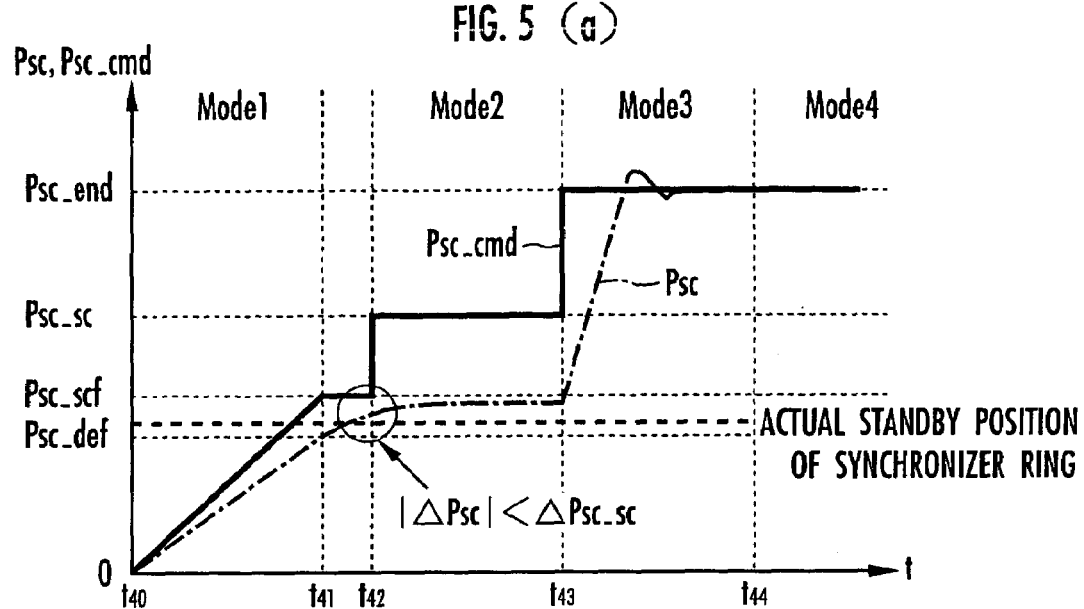
FIG. 5 is a graph illustrating a displacement of a shift arm in a shift operation and settings of the response specification parameter.
Figure 5:
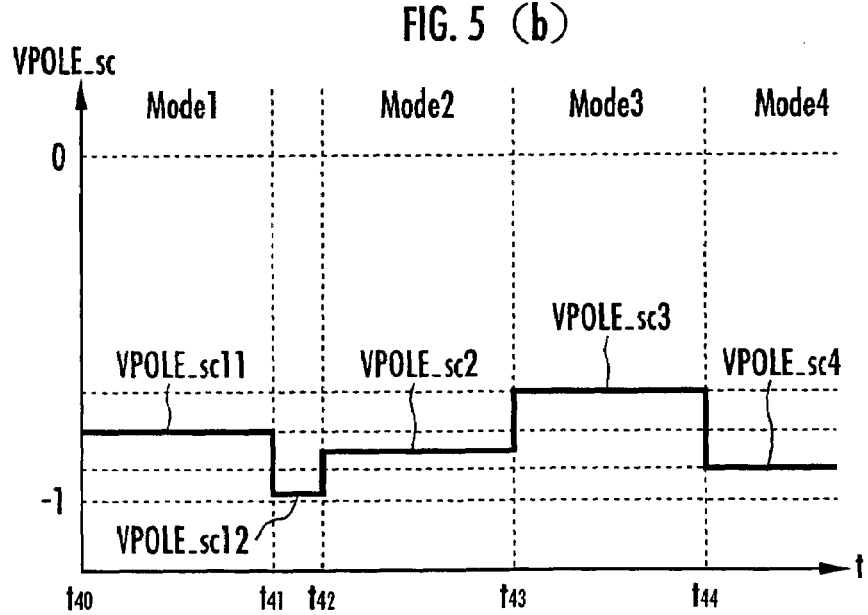
Figure 6:
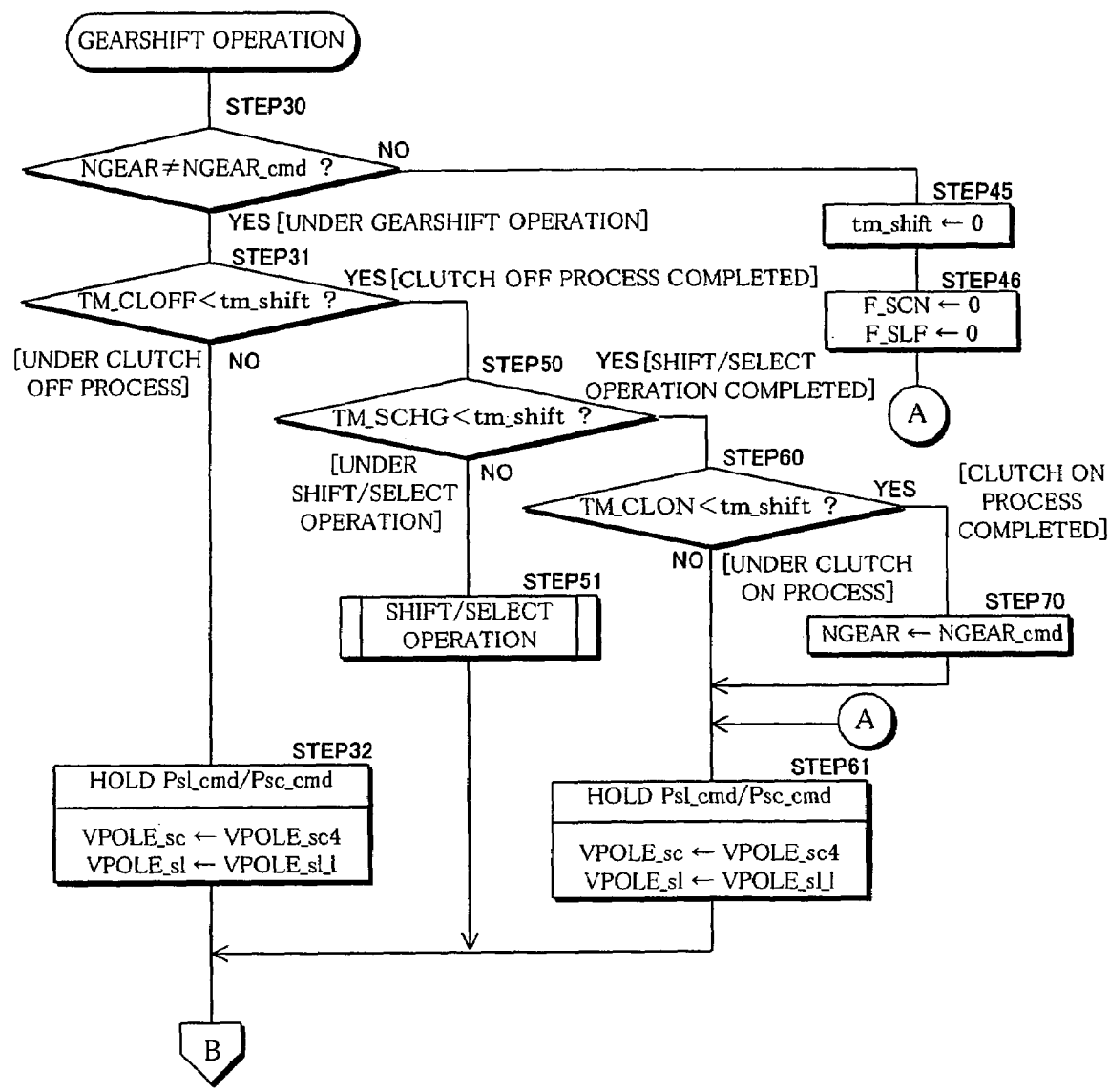
FIG. 6 is a flowchart of a gearshift operation.
Figure 7:
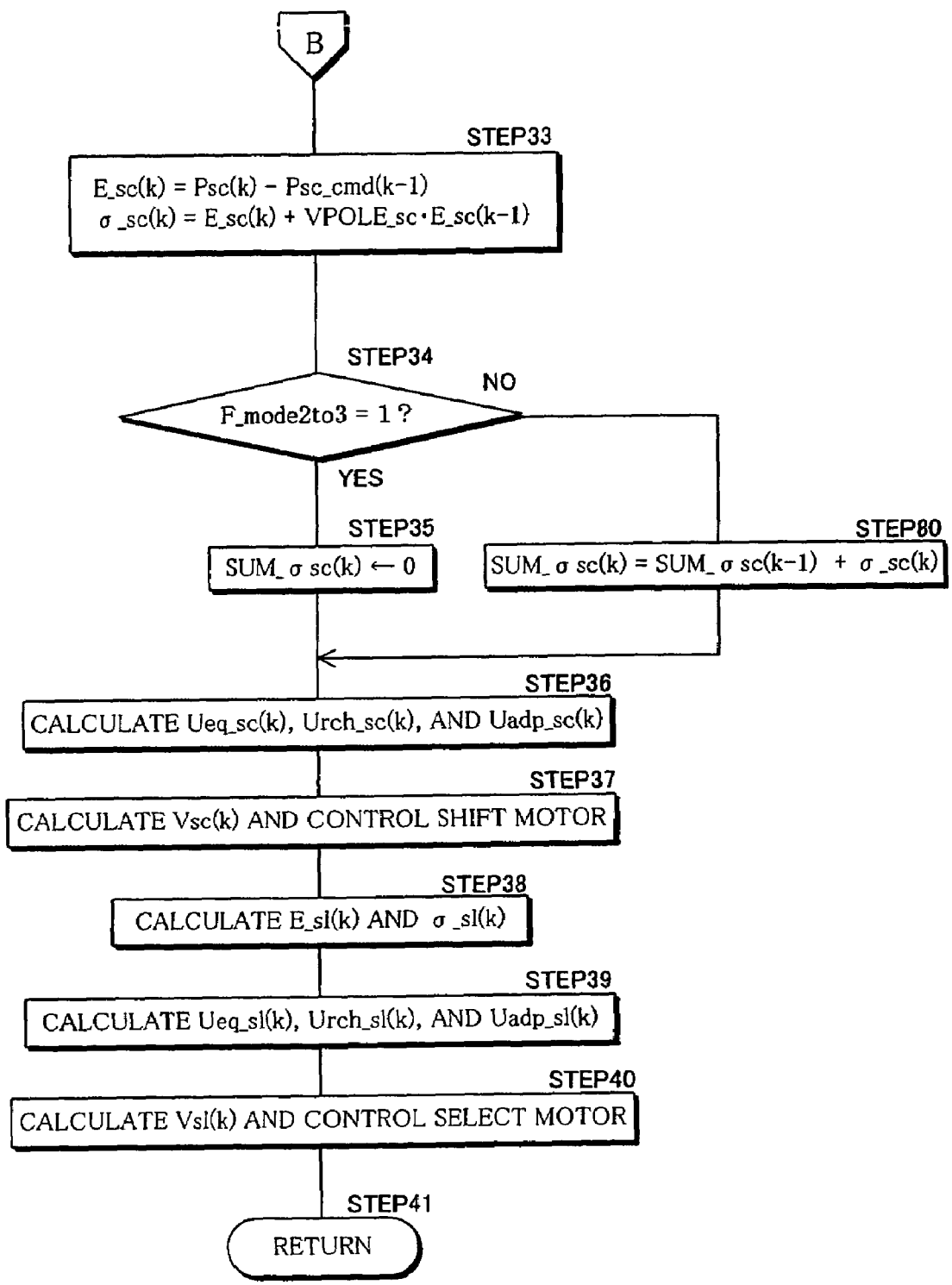
FIG. 7 is a flowchart of a gearshift operation.
Figure 8:
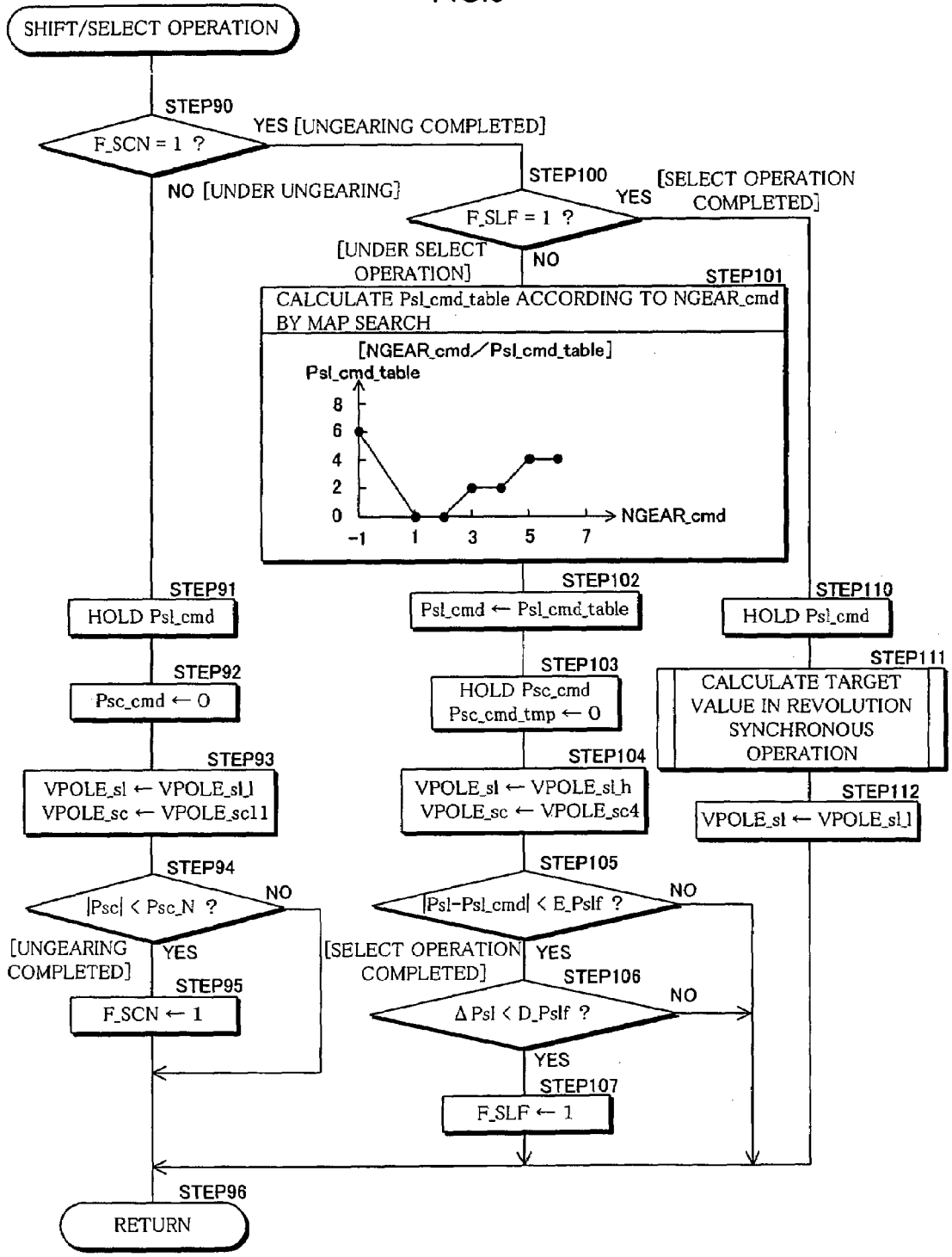
FIG. 8 is a flowchart of a shift/select operation.
Figure 9:
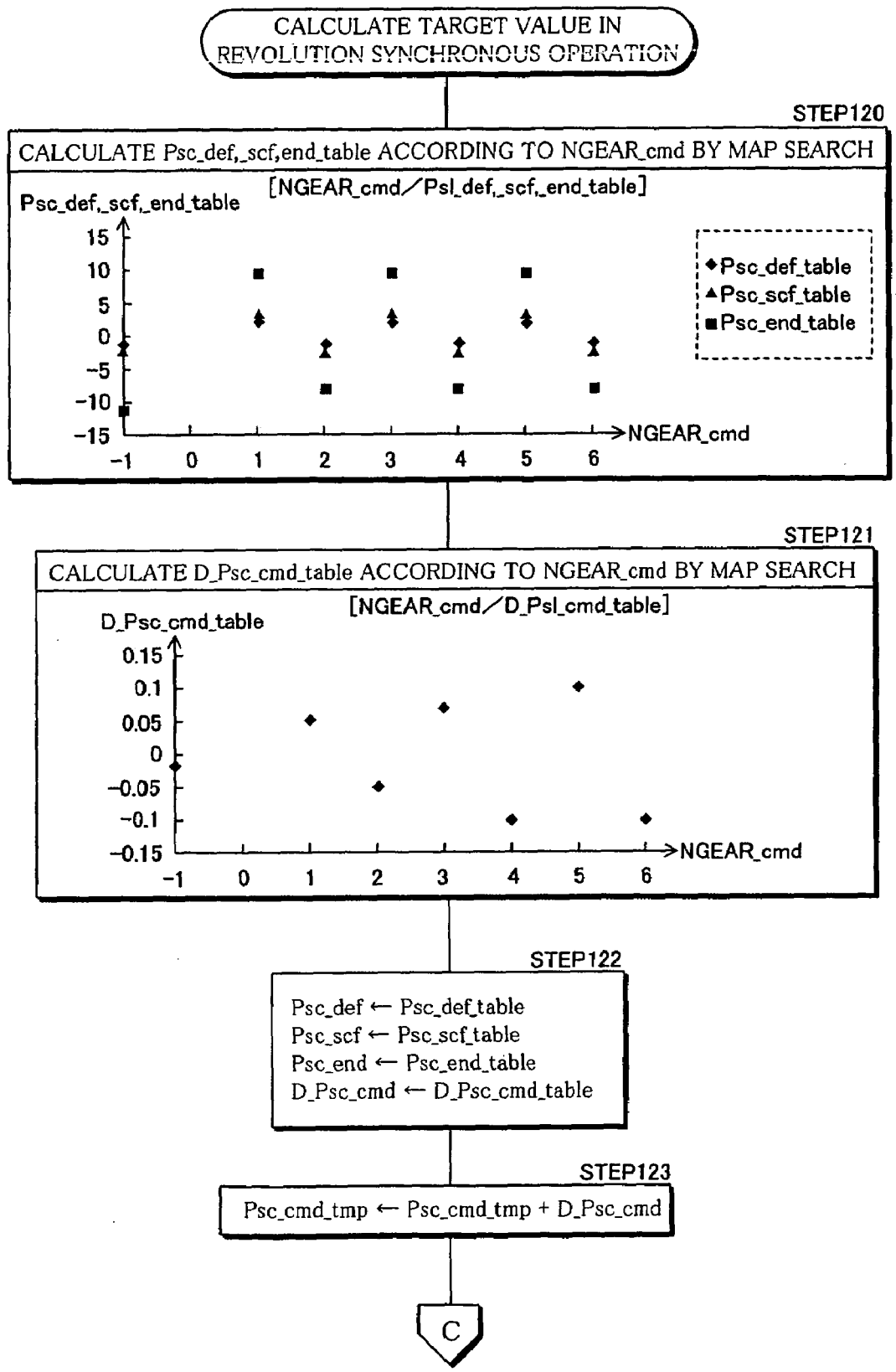
FIG. 9 is a flowchart of a calculation of a target value in a revolution synchronous operation.
Figure 10:
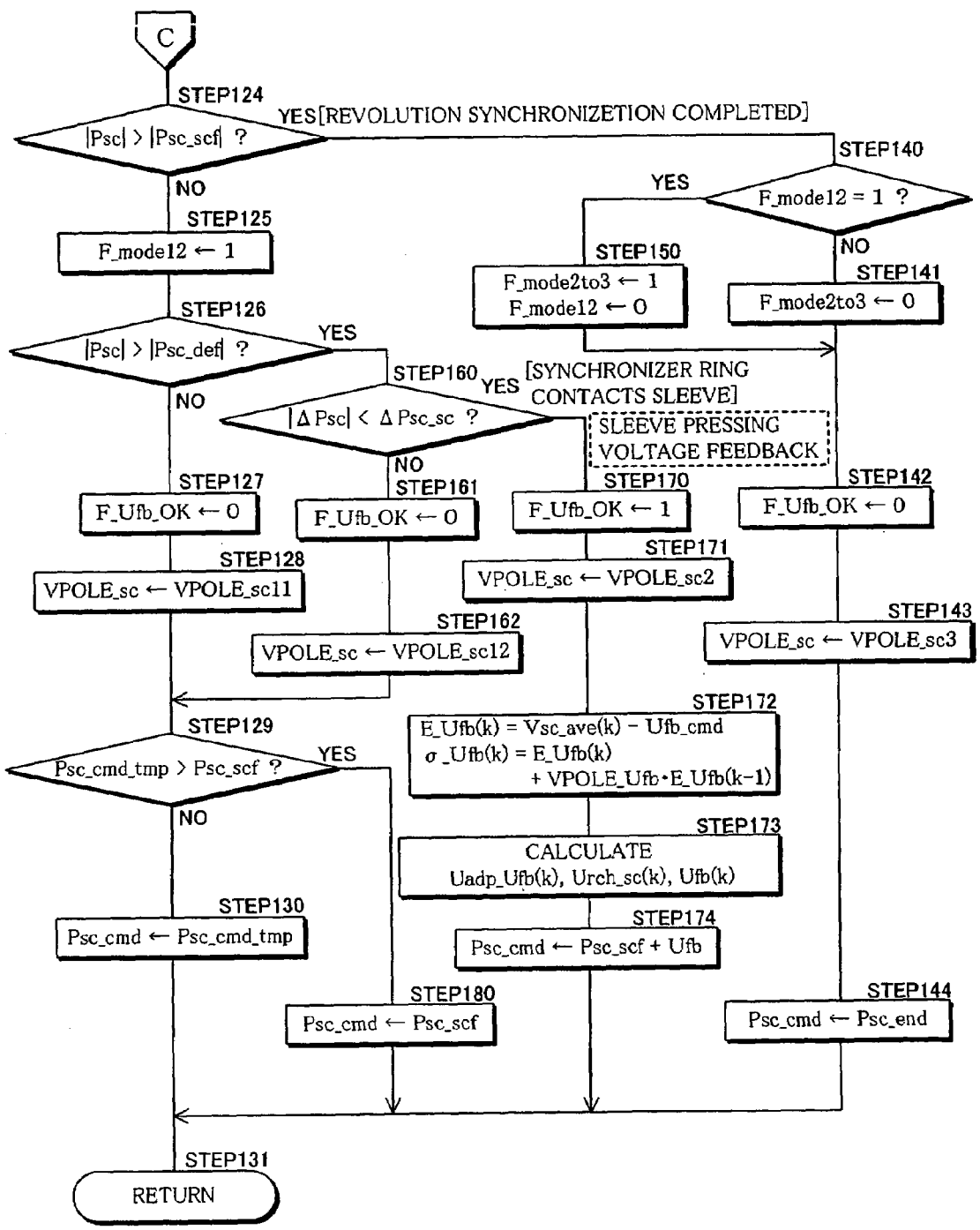
FIG. 10 is a flowchart of a calculation of a target value in a revolution synchronous operation.
Figure 11:
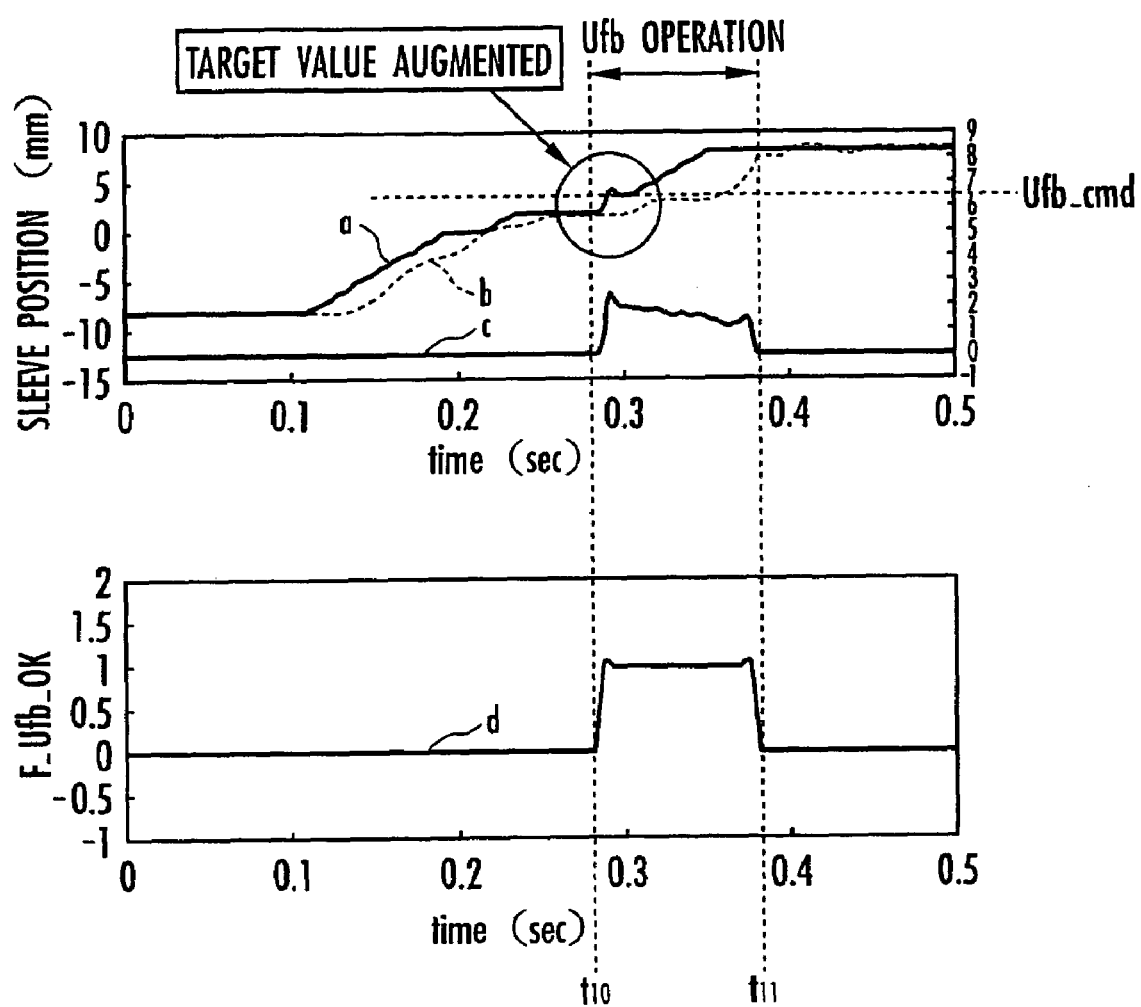
FIG. 11 is a graph illustrating an execution timing and effect of an augmentation of a target position in a shift direction.

The preferred embodiments of the present invention will now be described in detail hereinafter with reference to FIGS. 1 to 12. FIG. 1 shows a schematic diagram of a transmission including a contact mechanism according to the present invention; FIG. 2 shows a detail view of a shift/select mechanism of the transmission shown in FIG. 1; FIG. 3 shows a schematic diagram of a controller shown in FIG. 1; FIG. 4 shows a graph illustrating changes in disturbance-control capabilities caused by changing a response specification parameter; FIG. 5 shows a graph illustrating a displacement of a shift arm in a shift operation and settings of the response specification parameter; FIGS. 6 and 7 show flowcharts of a gearshift operation; FIG. 8 shows a flowchart of a shift/select operation; FIGS. 9 and 10 show flowcharts of a calculation of a target value in a revolution synchronous operation; FIG. 11 shows a graph illustrating an execution timing and effect of an augmentation of a target position in a shift direction; and FIG. 12 shows an example where the present invention is applied to a machine tool.

Referring to FIG. 1, there is shown a transmission 80 mounted on a vehicle to transmit an output of an engine 81 via a clutch 82 and a coupling gear 90. The coupling gear 90 engages with a gear 91 of a differential 93, by which the output of the engine 81 is transmitted to a drive wheel 94 via a drive shaft 92.

The transmission 80 is controlled in its operation by a controller 1 (including functions of a controller for a contact mechanism of the present invention), which is an electronic unit formed by a microcomputer, a memory, and the like. The controller 1 controls a gearshift operation of the transmission 80 by driving a select motor 12, a shift motor 13 (corresponding to an actuator of the present invention), and a clutch actuator 16 according to conditions of an accelerator pedal 95, a fuel supply control unit 96, a change lever 97, a clutch pedal 98, and a brake pedal 99.

The transmission 80 has an input shaft 5, an output shaft 4, first to sixth forward gear pairs 7a to 7f and 9a to 9f, a backward gear shaft 84, and a backward gear train 83, 85, and 86. In this regard, the input shaft 5, the output shaft 4, and the backward gear shaft 84 are arranged in parallel with each other.

The first to sixth forward gear pairs 7a to 7f and 9a to 9f have settings of gear ratio different from each other. The first forward gear 7a on the input side and the second forward gear 7b on the input side are arranged integrally with the input shaft 5, while the corresponding first forward gear 9a on the output side and second forward gear 9b on the output side are formed of idle gears freely rotatable with respect to the output shaft 4. A first/second gear synchronization mechanism 2a performs a switching operation between a state of the first forward gear 9a on the output side and the second forward gear 9b on the output side selectively connected to the output shaft 4 (a gearshift established state) and a state of the both gears 9a and 9b disconnected from the output shaft 4 (a neutral state).

The third forward gear 7c on the input side and the fourth forward gear 7d on the input side are formed of idle gears freely rotatable with respect to the input shaft 5, while the corresponding third forward gear 9c on the output side and fourth forward gear 9d on the output side are arranged integrally with the output shaft 4. A third/fourth gear synchronization mechanism 2b performs a switching operation between a state of the third forward gear 7c on the input side and the fourth forward gear 7d on the input side selectively connected to the input shaft 5 (a gearshift established state) and a state of the both gears 7c and 7d disconnected from the input shaft 5 (a neutral state).

Likewise, the fifth forward gear 7e on the input side and the sixth forward gear 7f on the input side are formed of idle gears freely rotatable with respect to the input shaft 5, while the corresponding fifth forward gear 9e on the output side and sixth forward gear 9f on the output side are arranged integrally with the output shaft 4. A fifth/sixth gear synchronization mechanism 2c performs a switching operation between a state of the fifth forward gear 7e on the input side and the sixth forward gear 7f on the input side selectively connected to the input shaft 5 (a gearshift established state) and a state of the both gears 7e and 7f disconnected from the input shaft 5 (a neutral state).

Moreover, the backward gear train 83, 85, and 86 is formed of a first backward gear 85 attached to the backward gear shaft 84, a second backward gear 83 arranged integrally with the input shaft 5, and a third backward gear 86 integral with the first/second gear synchronization mechanism 2a of the output shaft 4. The first backward gear 85 is splined to the backward gear shaft 84 for attachment. Thereby, the first backward gear 85 rotates integrally with the backward gear shaft 84 and is freely slidable in an axial direction of the backward gear shaft 84 between a position where it engages with both of the second backward gear 83 and the third backward gear 86 and a position where it is released from the engagement with them (a neutral position).

Moreover, the synchronization mechanisms 2a, 2b, and 2c and the first backward gear 85 are connected to shift forks 10a, 10b, 10c, and 10d, respectively, with a shift piece (See FIG. 2) disposed at an end of each of the shift forks being selectively engaged with a shift arm 11. The shift arm 11 rotates by means of the select motor 12. The shift forks are arranged substantially linearly in a line in a direction of arc (in the direction of the select operation) in which the shift arm 11 rotates. The shift arm 11 is selectively located in a position where it engages with each shift piece.

Moreover, the shift arm 11 moves in an axial direction (corresponding to a direction of a shift operation or a one-axis direction of the present invention) parallel to the input shaft 5 by means of the shift motor 13 with being engaged with one of the shift pieces. The shift arm 11 is then positioned in the neutral position and in gearshift established positions (shift positions).

FIG. 2(*a*) illustrates a configuration of the synchronization mechanism 2b (corresponding to the contact mechanism of the present invention) shown in FIG. 1. The configuration of the synchronization mechanism 2c is the same as the synchronization mechanism 2b. While the synchronization mechanism 2a differs from the synchronization mechanisms 2b and 2c in that it is provided on the output shaft 4, they have the same basic configuration and operations.

The synchronization mechanism 2b includes a coupling sleeve 22 (corresponding to a first engaging member and a contacting member of the present invention) rotating integrally with the input shaft 5, a synchronizer ring 23a (corresponding to a contacted member and a synchronization member of the present invention) arranged rotatably on the input shaft 5 and movably in the axial direction of the input shaft 5 between the coupling sleeve 22 and the third forward gear 7c on the input side (corresponding to a second engaging member of the present invention), a synchronizer ring 23b (corresponding to the synchronization member of the present invention) arranged rotatably on the input shaft 5 and movably in the axial direction of the input shaft 5 between the coupling sleeve 22 and the fourth forward gear 7d on the input side (corresponding to the second engaging member of the present invention), and a shift fork 10b connected to the coupling sleeve 22.

A shift piece 21 fixed at the end of the shift fork 10b is then engaged with the shift arm 11 fixed to the shift/select shaft 20. The shift/select shaft 20 rotates in response to an action of the select motor 12 (select operation) and moves in the axial direction in response to an action of the shift motor 13 (shift operation). With the shift arm 11 being engaged with the shift piece 21 by the select operation, the shift operation displaces the coupling sleeve 22 from the neutral position toward the third forward gear 7c on the input side (when the third gear position is selected) or toward the fourth forward gear 7d on the input side (when the fourth gear position is selected).

Both ends of the coupling sleeve 22 each have a hollow structure, with splines 30a and 30b formed in the inner circumferential surface of the hollow sections. Moreover, a spline 31a engageable with the spline 30a of the coupling sleeve 22 is formed on the outer circumferential surface of the synchronizer ring 23a. Also a spline 32a engageable with the spline 30a of the coupling sleeve 22 is formed on the outer circumferential surface of a portion opposed to the synchronizer ring 23a of the third forward gear 7c on the input side.

Likewise, a spline 31b engageable with the spline 30b of the coupling sleeve 22 is formed on the outer circumferential surface of the synchronizer ring 23b. Also a spline 32b engageable with the spline 30b of the coupling sleeve 22 is formed on the outer circumferential surface of a portion opposed to the synchronizer ring 23b of the fourth forward gear 7d on the input side.

If the coupling sleeve 22 rotating with the input shaft 5 is then moved toward the third forward gear 7c on the input side by means of the shift fork 10b, the coupling sleeve 22 comes into contact with the synchronizer ring 23a and further the synchronizer ring 23a also comes into contact with the third forward gear 7c on the input side. At this point, a frictional force generated by their contact causes synchronization in the number of revolutions between the coupling sleeve 22 and the third forward gear 7c on the input side via the synchronizer ring 23a.

In this manner, if the coupling sleeve 22 is moved toward the third forward gear 7c on the input side with the number of revolutions of the coupling sleeve 22 synchronized with that of the third forward gear 7c on the input side, the spline 30a formed in the coupling sleeve 22 passes through the spline 31a formed in the synchronizer ring 23a and then engages with the spline 32a formed in the third forward gear 7c on the input side. This provides a state in which power is transmitted between the input shaft 5 and the output shaft 4 (gearshift established state).

Similarly, if the coupling sleeve 22 rotating with the input shaft 5 is moved toward the fourth forward gear 7d on the input side by means of the shift fork 10b, the number of revolutions of the coupling sleeve 22 synchronizes with that of the fourth forward gear 7d on the input side via the synchronizer ring 23b. The spline 30b formed in the coupling sleeve 22 then passes through the spline 31b formed in the synchronizer ring 23b and engages with the spline 32b formed in the fourth forward gear 7d on the input side.

FIG. 2(b) is a diagram showing the linearly arranged shift pieces 21a, 21b, 21c, and 21d viewed from the side of the shift arm 11. In the select operation, the shift arm 11 moves in a Psl direction (select direction) shown in the diagram and is positioned in a first and second gear selecting position Psl_12, a third and fourth gear selecting position Psl_34, a fifth and sixth gear selecting position Psl_56, or a reverse (backward) selecting position Psl_r so as to engage with one of the shift pieces 21a, 21b, 21c, and 21d. In the shift operation, the shift arm 11 moves in a Psc direction (shift direction) shown in the diagram to establish a gear position (one of the first to sixth gear and reverse).

Subsequently, referring to FIG. 3, the controller 1 comprises a target position scheduler 52 (including a function of target position setting means of the present invention) for setting a target position (=a target position of the coupling sleeve 22) Psc_cmd of the shift arm 11 in the shift direction and a target position Psl_cmd of the shift arm 11 in the select direction, a shift controller 50 (including functions of actual position grasping means, control input determination means, contact detecting means, and offset value determination means of the present invention) for controlling an applied voltage Vsc (corresponding to a control input to an actuator of the present invention) to the shift motor 13 so as to obtain matching between an actual position Psc of the shift arm 11 in the shift direction (=an actual position of the coupling sleeve 22) and its target position Psc_cmd, and a select controller 51 for controlling an applied voltage Vsl to the select motor 12 so as to obtain matching between an actual position Psl of the shift arm 11 in the select direction and its target position Psl_cmd.

The shift controller 50 then determines an applied voltage Vsc to the shift motor 13 for each predetermined control cycle and the select controller 51 determines an applied voltage Vsl to the select motor 12.

The shift controller 50 grasps the actual position Psc of the coupling sleeve 22 on the basis of a revolution detection signal or the like obtained from a revolution sensor (not shown) provided in the shift motor 13. Similarly, the select controller 51 grasps the actual position Psl of the shift arm 11 on the basis of a revolution detection signal or the like obtained from a revolution sensor (not shown) provided in the select motor 12.

The shift controller 50 comprises a sliding mode controller 53 for determining the applied voltage Vsc to the shift motor 13 by using a sliding mode control, a VPOLE_sc calculating section 54 for setting a response specification parameter VPOLE_sc in the sliding mode control, an offset value determination section 55 (corresponding to offset value determination means of the present invention) for determining an offset value Ufb for a target position Psc_cmd in the shift direction by using the sliding mode control (corresponding to a response specification type control of the present invention), and an adder 56 for correcting the target position Psc_cmd by adding the offset value Ufb to the target position Psc_cmd in the shift direction set by the target position scheduler 52. In this regard, the target position scheduler 52 and the adder 56 form target position setting means of the present invention.

Moreover, the select controller 51 comprises a sliding mode controller 60 for determining an applied voltage Vsl to the select motor 12 by using the sliding mode control and a VPOLE_sl calculating section 61 for setting a response specification parameter VPOLE_sl in the sliding mode control.

The sliding mode controller 60 provided in the select controller 51 models the structure of moving the shift arm 11 in the select direction using the following equation (1), calculates a control value V_sl(k) of the voltage applied to the select motor 12 using the following equations (2) to (7), and conducts a positioning control of the shift arm 11 in the select direction.

[Eq. 1]

$$Psl(k+1) = a1\_sl \cdot Psl(k) + a2\_sl \cdot Psl(k-1) + b1\_sl \cdot V\_sl(k) + b2\_sl \cdot V\_sl(k-1) \quad (1)$$

where a1_sl, a2_sl, b1_sl, and b2_sl are model parameters.

A difference E_sl(k) between an actual position Psl(k) of the shift arm 11 in the select direction in the kth control cycle and its target position Psl_cmd(k−1) in the (k−1)th control cycle of the sliding mode controller 60 is expressed by the following equation (2), and a switching function σ_sl(k) for regulating a convergence behavior of the difference E_sl(k) in the sliding mode is expressed by the following equation (3):

[Eq. 2]

$$E\_sl(k) = Psl(k) - Psl\_cmd(k-1) \quad (2)$$

where E_sl(k) is a difference in the select direction in the kth control cycle; Psl(k) is an actual position of the shift arm 11 in the select direction in the kth control cycle; and Psl_cmd(k) is a target position of the shift arm 11 in the select direction in the (k−1)th control cycle.

[Eq. 3]

$$\sigma\_sl(k) = E\_sl(k) + VPOLE\_sl \cdot E\_sl(k-1) \quad (3)$$

where VPOLE_sl is a switching function setting parameter (−1<VPOLE_sl<0).

By substituting the foregoing equations (1) and (2) for the equation (3) on the assumption that σ_sl(k+1)=σsl(k) as the switching function in the above equation (3), an equivalent control input Ueq_sl(k) is obtained as expressed by the following equation (4):

[Eq. 4]

$$Ueq\_sl(k) = \frac{1}{b1\_sl}\{(1 + VPOLE\_sl - a1\_sl) \cdot Psl(k) + (VPOLE\_sl - a2\_sl) \cdot Psl(k-1) - b2\_sl \cdot Vsl(k-1) + Psl\_cmd(k) + (VPOLE\_sl - 1) \cdot Psl\_cmd(k-1) - VPOLE\_sl \cdot Psl\_cmd(k-1)\} \quad (4)$$

where Ueq_sl(k) is an equivalent control input in the kth control cycle.

Subsequently, a reach-rule input Urch_sl(k) is calculated in the following equation (5), an adaptation-rule input Uadp_sl(k) is calculated in the following equation (6), and a control value Vsl(k) of the applied voltage to the select motor 12 is calculated in the following equation (7):

[Eq. 5]
$$\text{Urch\_sl}(k) = -\frac{\text{Krch\_sl}}{\text{b1\_sl}} \cdot \sigma\_\text{sl}(k) \qquad (5)$$

where Urch_sl(k) is a reach-rule input in the kth control cycle and Krch_sl is a feedback gain.

[Eq. 6]
$$\text{Uadp\_sl}(k) = -\frac{\text{Kadp\_sl}}{\text{b1\_sl}} \cdot \sum_{i=0}^{k} \sigma\_\text{sl}(i) \qquad (6)$$

where Uadp_sl(k) is an adaptation-rule input in the kth control cycle and Kadp_sl is a feedback gain.

[Eq. 7]
$$Vsl(k) = Ueq\_sl(k) + Urch\_sl(k) + Uadp\_sl(k) \qquad (7)$$

where Vsl(k) is a control value of an applied voltage to the select motor 12 in the kth control cycle.

The sliding controller 53 provided in the shift controller 50 models a structure of positioning the shift arm 11 in the shift direction using the following equation (8) and calculates a control value V_sc(k) of the voltage to be applied to the shift motor 13 using the following equations (9) to (15) for the positioning control of the shift arm 11 in the shift direction:

[Eq. 8]
$$Psc(k+1) = a1\_sc \cdot Psc(k) + a2\_sc \cdot Psc(k-1) + b1\_sc \cdot Vsc(k) + b2\_sc \cdot Vsc(k-1) \qquad (8)$$

where a1_sc, a2_sc, b1_sc, and b2_sc are model parameters.

A difference E_sc(k) between an actual position Psc(k) of the shift arm 11 in the shift direction in the kth control cycle and its target position Psl_cmd(k−1) in the (k−1)th control cycle of the sliding mode controller 53 is expressed by the following equation (9), and a switching function σ_sc(k) for regulating a convergence behavior of the difference E_sc(k) in the sliding mode is expressed by the following equation (10):

[Eq. 9]
$$E\_sc(k) = Psc(k) - Psc\_cmd(k-1) \qquad (9)$$

where E_sc(k) is a difference in the shift direction in the kth control cycle; Psc(k) is an actual position of the shift arm 11 in the shift direction in the kth control cycle; and Psc_cmd(k) is a target position of the shift arm 11 in the select direction in the (k−1)th control cycle.

[Eq. 10]
$$\sigma\_sc(k) = E\_sc(k) + VPOLE\_sc \cdot E\_sc(k-1) \qquad (10)$$

where VPOLE_sc is a switching function setting parameter (−1<VPOLE_sc<0).

Moreover, an integral of the switching function SUM_σsc(k) is calculated in the following equation (11):

[Eq. 11]
$$SUM\_\sigma sc(k) = SUM\_\sigma sc(k-1) + \sigma\_sc(k) \qquad (11)$$

where SUM_σsc(k) is an integral of the switching function in the kth control cycle.

Then, by substituting the foregoing equations (8) and (9) for the equation (10) on the assumption that σ_sc(k+1)=σ_sc(k) as the switching function in the above equation (10), an equivalent control input Ueq_sc(k) is obtained as expressed by the following equation (12):

[Eq. 12]
$$Ueq\_sc(k) = \frac{1}{b1\_sc}\{(1 + VPOLE\_sc - a1\_sc) \cdot Psc(k) + \\ (VPOLE\_sc - a2\_sc) \cdot Psc(k-1) - b2\_sc \cdot Vsc(k-1) + \\ Psc\_cmd(k) + (VPOLE\_sc - 1) \cdot Psc\_cmd(k-1) - \\ VPOLE\_sc \cdot Psc\_cmd(k-1)\} \qquad (12)$$

where Ueq_sl(k) is an equivalent control input in the kth control cycle.

Subsequently, a reach-rule input Urch_sc(k) is calculated in the following equation (13), an adaptation-rule input Uadp_sc(k) is calculated in the following equation (14), and a control value Vsc(k) of the applied voltage to the shift motor 13 is calculated in the following equation (15):

[Eq. 13]
$$\text{Urch\_sc}(k) = -\frac{Krch}{b1\_sc} \cdot \sigma\_sc(k) \qquad (13)$$

where Urch_sc(k) is a reach-rule input in the kth control cycle and Krch_sc is a feedback gain.

[Eq. 14]
$$\text{Uadp\_sc}(k) = -\frac{\text{Kadp\_sc}}{b1\_sc} \cdot SUM\_\sigma sc(k) \qquad (14)$$

where Uadp_sc(k) is an adaptation-rule input in the kth control cycle and Kadp_sc is a feedback gain.

[Eq. 15]
$$Vsc(k) = Ueq\_sc(k) + Urch\_sc(k) + Uadp\_sc(k) \qquad (15)$$

where Vsc(k) is a control value of an applied voltage to the shift motor 13 in the kth control cycle.

The offset value determination section 55 determines an offset value Ufb using the following equations (16) to (20) in order to prevent a lack of a pressing force against the synchronizer rings 23a and 23b applied by the coupling sleeve 22 in the shift operation:

[Eq. 16]
$$E\_Ufb(k) = Vsc\_ave(k) - Ufb\_cmd \qquad (16)$$

where Vsc_ave(k) is a moving average of the control input Vsc to the shift motor 13 until the kth control cycle, Ufb_cmd is a target control input that causes the pressing force of the coupling sleeve to be at a predetermined level, and E_Ufb(k) is a difference between Vsc_ave and Ufb_cmd in the kth control cycle.

[Eq. 17]

$$\sigma\_Ufb(k)=E\_Ufb(k)+VPOLE\_Ufb \cdot E\_Ufb(k-1) \quad (17)$$

where VPOLE_Ufb is a switching function setting parameter.

[Eq. 18]

$$Uadp\_Ufb(k) = Kadp\_Ufb \cdot \sum_{i=0}^{k} \sigma\_Ufb(i) \quad (18)$$

where Kadp_Ufb is an adaptation-rule gain and Kadp_Ufb(k) is an adaptation-rule input in the kth control cycle.

[Eq. 19]

$$Urch\_Ufb(k)=Krch\_Ufb \cdot \sigma\_Ufb(k) \quad (19)$$

where Krch_Ufb is a reach-rule gain and Krch_Ufb(k) is a reach-rule input in the kth control cycle.

[Eq. 20]

$$Ufb(k)=Ufb\_ini+Urch\_Ufb(k)+Uadp\_Ufb(k) \quad (20)$$

where Ufb_ini is an initial value of the offset value and Ufb(k) is a control input in the kth control cycle.

The transmission 80 may have a difference between the target value Psl_cmd of a preset selected position for each gear position a the target value Psl_cmd* corresponding to a true selected position due to a mechanical wobble or individual variation in parts. Accordingly the select controller 51 changes the switching function setting parameter VPOLE_sl in the foregoing equation (3) according to the select operation or the shift operation so as to vary the disturbance-control capabilities.

Referring to FIG. 4, there is shown response specification characteristics of the sliding mode controller 55 of the select controller 51. The graph shows responses of a control system received when a step disturbance d is applied under the condition where the switching function $\sigma\_sl=0$ and the difference $E\_sl=0$ with the VPOLE_sl set to −0.5, −0.8, −0.99, and −1.0, taking the difference E_sl, the switching function $\sigma\_sl$, and the disturbance d along the ordinate and taking time k along the abscissa.

As apparent from FIG. 4, the sliding mode controller 55 has a characteristic that an effect of the disturbance d on the difference E_sl gets smaller along with a decrease in an absolute value of VPOLE_sl. On the other hand, the difference E_sl permitted by the sliding mode controller 55 gets larger as the absolute value of VPOLE_sl increases to be closer to 1. In this condition, the behavior of the switching function $\sigma\_sl$ is identical independently of the VPOLE_sl value. Therefore, it is understood that the capabilities of controlling the disturbance d can be specified by using VPOLE_sl.

Therefore, the VPOLE_sl calculating section 56 of the select controller 51 changes the VPOLE_sl value according to whether the shift operation is under execution or not (the select operation) as expressed by the following equation (21):

[Eq. 21]

$$VPOLE\_sl = \begin{cases} VPOLE\_sl\_l: & \text{Shift operation} \\ VPOLE\_sl\_h: & \text{Other than shift operation} \end{cases} \quad (21)$$

where, for example, VPOLE_sl_l and VPOLE_sl_h are set to −0.95 and −0.7, respectively, so as to achieve |VPOLE_sl_l|>|VPOLE_sl_h|.

The select controller 51 determines that the shift operation is active if both relations expressed by the following equations (22) and (23) are satisfied:

[Eq. 22]

$$|Psc\_cmd|>Psc\_cmd\_vp(\approx 0.3 \text{ mm}) \quad (22)$$

where Psc_cmd is a target value in the shift direction and Psc_cmd_vp is a reference value (for example, 0.3 mm) of a displacement from a preset neutral position (Psc_cmd=0).

[Eq. 23]

$$|\Delta Psl|<dpsl\_vp(\approx 0.1 \text{ mm/step}) \quad (23)$$

where ΔPsl is a displacement in the select direction from the previous control cycle and dpsl_vp is a reference value (for example, 0.1 mm/step) of a displacement in a preset control cycle.

The disturbance-control capabilities can be set lower than in the select operation with VPOLE_sl in the shift operation being VPOLE_sl_l using the foregoing equation (21). Thereby, it becomes possible to prevent interference between the shift arm 11 and the shift piece 21a, thus enabling the movement of the shift arm 11 in the shift direction.

Subsequently, referring to FIG. 5, the shift controller 50 executes the following four modes (mode 1 to mode 4) in the shift operation to establish the respective gear positions. Then, the shift controller 50 changes the switching function setting parameter VPOLE_sc in each mode as expressed by the following equation (24). By changing the switching function setting parameter VPOLE_sc in this manner, the disturbance-control capabilities of the shift controller 50 can be changed similarly to the select controller 51 as described above.

[Eq. 24]

$$VPOLE\_sc = \begin{cases} VPOLE\_sc11(=-0.8): & Mode1(|Psc(k)| < |Psc\_def|) \\ VPOLE\_sc12(=-0.98): & Mode1(|Psc(k)| \geq |Psc\_def|) \\ VPOLE\_sc2(=-0.85): & Mode2(|Psc\_def| \leq |Psc(k)| \leq |Psc\_scf|) \\ VPOLE\_sc3(=-0.7): & Mode3(|Psc(k)| > |Psc\_scf|) \\ VPOLE\_sc4(=-0.9): & Mode4 \end{cases} \quad (24)$$

where Psc_def is a standby position of the synchronizer ring and Psc_scf is a contact position between the coupling sleeve and the synchronizer ring.

FIG. 5(*a*) shows a graph with the actual position Psc and the target position Psc_cmd of the shift arm 11 in the shift direction arranged along the ordinate and time t arranged along the abscissa. FIG. 5(*b*) shows a graph with the switching function setting parameter VPOLE_sc arranged along the ordinate and time t, which is the same as in FIG. 5(a), arranged along the abscissa. Hereinafter, the description will be made by giving an example of establishing the third gear position.

(1) Mode 1 ($T_{40}$ to $t_{42}$: Target Value Follow-up and Compliance Mode)

The VPOLE_sc calculating section 54 (see FIG. 3) of the shift controller 50 keeps VPOLE_sc set to VPOLE_sc11 (=−0.8) since the shift operation has been started from the neutral position until the actual position Psc of the shift arm 11 (see FIG. 2(a)) reaches the standby position Psc_def of the synchronizer ring 23a (Psc<Psc_def). This increases the disturbance-control capabilities of the shift controller 50 and enhances compliance of the shift arm 11 with the target position Psc_cmd.

Then, the VPOLE_sc calculating section 54 sets VPOLE_sc to VPOLE_sc12 (=−0.98) at $t_{4l}$ when the actual position Psc of the shift arm 11 reaches the standby position Psc_def of the synchronizer ring 23a. This reduces the disturbance-control capabilities of the shift controller 50 and generates a buffering effect when the coupling sleeve 22 contacts the synchronizer ring 23a, thereby preventing an occurrence of a sonic boom or forced pressing against the synchronizer ring 23a.

(2) Mode 2 ($t_{42}$ to $t_{43}$: Revolution Synchronization Control Mode)

After conditions of Psc_def≦Psc≦Psc_scf and ΔPsc<ΔPsc_sc (ΔPsc_sc: a contact judgment value for a contact between the coupling sleeve 22 and the synchronizer ring 23a) are satisfied, an appropriate pressing force is applied to the synchronizer ring 23a with the target value Psc_cmd being Psc_sc and VPOLE_sc being VPOLE_sc2 (=−0.85). Thereby, the number of revolutions is synchronized between the coupling sleeve 22 and the third forward gear 7c on the input side.

(3) Mode 3 ($t_{43}$ and $t_{44}$: Static Mode)

The target value Psc_cmd is set to a shift completion target value Psc_end at $t_{43}$ when the condition Psc_scf<Psc is satisfied. In order to prevent Psc from overshooting Psc_cmd (An occurrence of the overshoot generates a hitting sound on a stopper member not shown), the integral of the switching function SUM_σsc is reset and VPOLE_sc is set to VPOLE_sc3 (=−0.7) to enhance the disturbance-control capabilities. Thereby, the coupling sleeve 22 moves while passing through the synchronizer ring 23a and engages with the third forward gear 7c on the input side.

(4) Mode 4 ($t_{44}$ and After: Hold Mode)

After a completion of the shift operation and during the select operation, VPOL_sc is set to VPOLE_sc4 (=−0.9) to reduce the disturbance-control capabilities in the shift controller 50 for power saving with a reduction of power applied to the shift motor 13. Moreover, it is possible to avoid interference between the shift arm 11 and the shift pieces 21a to 21d during the select operation by performing the select operation with the disturbance-control capabilities in the shift controller 50 being reduced by setting the VPOLE_sc to VPOLE_sc4 (=−0.9).

The following describes an execution procedure for controlling the transmission 80 using the controller 1 with reference to flowcharts shown in FIGS. 6 to 10.

When a vehicle driver operates the accelerator pedal 95 (see FIG. 1) or the brake pedal 99, the controller 1 determines a driving force index Udrv for determining a driving force applied to the drive wheel 94 according to the operation using the following equation (25):

[Eq. 25]
$$Udrv = \begin{cases} AP & \text{(When the accelerator pedal is operated)} \\ Kbk \times BK & \text{(When the brake pedal is operated)} \end{cases} \quad (25)$$

where Udrv is a driving force index, AP is an accelerator pedal opening, BK is a brake pedal pressure, and Kbk is a coefficient for converting a brake pedal pressure (0 to the maximum) to an accelerator pedal opening (0 to −90 degrees).

The controller 1 determines whether to perform a gearshift operation of the transmission 80 on the basis of the driving force index Udrv. If the gearshift operation is to be performed, it obtains a selection target value NGEAR_cmd corresponding to a desired gear position on the basis of the driving force index Udrv and a vehicle speed VP and executes the "gearshift operation." A relation between the gear selection target value NGEAR_cmd and a selected gear position is as shown in the following Table (1):

TABLE 1

(1) Correspondence table between gear selection target value (NGEAR_cmd) and selected gear position

| | NGEAR_cmd | | | | | | |
|---|---|---|---|---|---|---|---|
| | −1 | 1 | 2 | 3 | 4 | 5 | 6 | 0 |
| Selected gear position | Reverse | 1st | 2nd | 3rd | 4th | 5th | 6th | Neutral |

In this regard, the "gearshift operation" is executed in three processes: a "clutch OFF process" of enabling the shift/select operation of the transmission 80 with the clutch 82 (see FIG. 1) put in a "clutch OFF" state; a "gear change process" of changing the selected gear position NGEAR to a gear selection target value NGEAR_cmd with the shift/select operation of the transmission 80 in the "clutch OFF" state; and a "clutch ON process" of returning the clutch 82 to a "clutch ON" state after a completion of the "gear change process."

In order to grasp timings from the start point of the "gearshift operation" to the end of each process, clutch OFF completion time TM_CLOFF, gear change completion time TM_SCHG, and clutch ON completion time TM_CLON are preset (TM_CLOFF<TM_SCHG<TM_CLON).

The controller 1 starts a gearshift operation reference timer at the start of the "gearshift operation" and turns off the clutch 82 by starting the "clutch OFF" process. It then starts the "gear change process" when clocking tm_shift of the gearshift operation reference timer exceeds the clutch OFF completion time TM_CLOFF. Thereafter, when the clocking tm_shift of the gearshift operation reference timer exceeds the gear change completion time TM_SCHG, the controller 1 turns on the clutch 82 by starting the "clutch ON process."

The flowcharts shown in FIGS. 6 and 7 show an execution procedure for the "gearshift operation" of the transmission 80 performed by the controller 1 after starting the "clutch OFF process." First the controller 1 determines whether the current selected gear position NGEAR of the transmission 80 matches the gear selection target value NGEAR_cmd in step 30.

If the selected gear position NGEAR matches the gear selection target value NGEAR_cmd and thus the "gearshift operation" is determined to be completed, the control branches to step 45, where the controller 1 clears the clocking tm_shift of the gearshift operation reference timer. In the next step 46, the controller 1 resets an ungearing completion flag F_SCN (F_SCN=0), which is set at a completion of ungearing of the transmission 80 and resets a select completion flag F_SLF set at a completion of the select operation of the transmission 80 (F_SLF=0).

Then, in step 61, the controller 1 holds the current selected gear position by maintaining the target position Psc_cmd of the shift arm 11 in the shift direction of the shift controller 50 and the target position Psl_cmd of the shift arm 11 in the select direction of the select controller 51 at the current values. Thereafter, the control proceeds to step 33 in FIG. 7.

Moreover, at that time, the VPOLE_sc calculating section 54 of the shift controller sets the response specification parameter VPOLE_sc in the sliding mode controller 53 of the shift controller 50 to VPOLE_sc4 (=−0.9). This reduces the disturbance-control capabilities of the shift controller 50 for power saving of the shift motor 13.

Furthermore, the VPOLE_sl calculating section 56 of the select controller 51 sets the response specification parameter VPOLE_sl in the sliding mode controller 55 of the select controller 51 to VPOLE_sl_1 (=−0.95). This reduces the disturbance-control capabilities of the shift controller 55 for power saving of the select motor 12.

On the other hand, if the current selected gear position NGEAR of the transmission 80 does not match the gear selection target value NGEAR_cmd and thus the "gearshift operation" of the transmission 80 is determined to be under execution in step 30, the control proceeds to step 31.

In step 31, the controller 1 determines whether the clocking tm_shift of the gearshift operation reference timer exceeds the clutch OFF completion time TM_CLOFF. If the clocking tm_shift of the gearshift operation reference timer does not exceed the clutch OFF completion time TM_CLOFF and thus the "clutch OFF process" is determined to be incomplete, the control proceeds to step 32, where the controller 1 holds the current selected gear position by performing the same processing as in step 61.

On the other hand, if the clocking tm_shift of the gearshift operation reference timer exceeds the clutch OFF completion time TM_CLOFF and thus the "clutch OFF process" is determined to be completed in step 31, the control branches to step 50, where the controller 1 determines whether the clocking tm_shift of the gearshift operation reference timer exceeds the gear change completion time TM_SCHG.

If the clocking tm_shift of the gearshift operation reference timer does not exceed the gear change completion time TM_SCHG and thus the "gear change process" is determined to be under execution in step 50, the control proceeds to step 51, where the controller 1 executes the "shift/select operation". The control then proceeds to step 33 in FIG. 7.

On the other hand, if the clocking tm_shift of the gearshift operation reference timer exceeds the gear change completion time TM_SCHG and thus the "gear change process" is determined to be completed in step 50, the control branches to step 60, where the controller 1 determines whether the clocking tm_shift of the gearshift operation reference timer exceeds the clutch ON completion time TM_CLON.

Then, if the clocking tm_shift of the gearshift operation reference timer does not exceed the clutch ON completion time TM_CLON and thus the "clutch ON process" is determined to be under execution in step 60, the controller 1 performs the foregoing processing in step 61 and then the control proceeds to step 33 in FIG. 7.

On the other hand, if the clocking tm_shift of the gearshift operation reference timer exceeds the clutch ON completion time TM_CLON (TM_CLON<tm_shift) and thus the "clutch ON process" is determined to be completed in step 60, the control branches to step 70, where the controller 1 sets the current selected gear position NGEAR to the gear selection target value NGEAR_cmd. Thereafter, the control proceeds to step 33 in FIG. 7.

Steps 33 to 38 and step 80 in FIG. 7 are processing to be performed by the sliding mode controller 53 of the shift controller 50. The sliding mode controller 53 calculates E_sc(k) in the foregoing equation (9) and calculates σ_sc(k) in the foregoing equation (10) in step 33.

Subsequently, if a flag F_Mode2to3 set at a transition from the foregoing mode 2 to mode 3 has been set (F_Mode2to3=1) in the next step 34, the control proceeds to step 35, where the sliding mode controller 53 resets the integral of the switching function SUM_σsc(k) calculated in the foregoing equation (11) (SUM_σsc=0). On the other hand, if a flag F_Mode2to3 has been reset (F_Mode2to3=0) in step 34, the control branches to step 80, where the sliding mode controller 53 updates the integral of the switching function SUM_σsc(k) in the foregoing equation (11) and then the control proceeds to step 36.

Then, the sliding mode controller 53 calculates the equivalent control input Ueq_sc(k), the reach-rule input Urch_sc(k), and the adaptation-rule control input Uadp_sc(k) in the foregoing equations (12) to (14) in step 36, and calculates the control input Vsc(k) of the applied voltage to the shift motor 13 in the foregoing equation (15) and controls the shift motor 13 in step 37.

The subsequent steps 38 to 40 are processing to be performed by the sliding mode controller 60 of the select controller 51. The sliding mode controller 60 calculates E_sl(k) in the foregoing equation (2) and calculates σ_sl(k) in the foregoing equation (3) in step 38.

Subsequently, the sliding mode controller 60 calculates the equivalent control input Ueq_sl(k), the reach-rule input Urch_sl(k), and the adaptation-rule input Uadp_sl(k) in the foregoing equations (4) to (6) in the next step 39, calculates the control input Vsl(k) of the applied voltage to the select motor 12 in the foregoing equation (7) and controls the select motor 12 in step 40.

Subsequently, referring to FIG. 8, there is shown a flowchart of the "shift/select operation" in step 51 shown in FIG. 6. If the ungearing completion flag F_SCN has been reset (F_SCN=0) and thus the ungearing operation is determined to be under execution in step 90, the control proceeds to step 91.

Steps 91 and 92 are processing to be performed by the target position scheduler 52 (see FIG. 3). The target position scheduler 52 holds the target position Psl_cmd of the shift arm 11 in the select direction at the current position in step 91 and sets the target position Psc_cmd of the shift arm 11 in the shift direction to zero (neutral position) in step 92. Step 93 is processing to be performed by the VPOLE_sc calculating section 54 (see FIG. 3) and the VPOLE_sl calculating section 61. The VPOLE_sl calculating section 61 sets VPOLE_sl to VPOLE_sl_1 (−0.95) and the VPOLE_sc calculating section 54 sets VPOLE_sc to VPOLE_sc11 (=−0.8).

This reduces the disturbance-control capabilities of the select controller 51, thereby increasing a permissible range of a deviation of the shift arm 11 in the select direction. Therefore, it is possible to move the shift arm 11 smoothly in the shift direction with a smaller influence of interference between the shift arm 11 and the shift piece 21.

Then, if the position (an absolute value) of the shift arm 11 in the shift direction is less than a preset neutral judgment value Psc_N (for example, 0.15 mm) in the next step 94, it is determined that the ungearing has been completed and the control proceeds to step 95, where the controller 1 sets the ungearing completion flag F_SCN (F_SCN=1). Then, the control proceeds to step 96, where the "shift/select operation" is terminated. If the position (absolute value) of the shift arm 11 in the shift direction is equal to or more than a neutral judgment value PSC_N (for example, 0.15 mm) in step 94, the control proceeds to step 96 to terminate the "shift/select operation" without setting the ungearing completion flag F_SCN.

On the other hand, if the ungearing completion flag F_SCN is set and thus the gearing operation is determined to be completed in step 90, the control branches to step 100. Steps 100 to 103 and step 110 are processing to be performed by the target position scheduler 52. The target position scheduler 52 determines whether the select completion flag F_SLF is set in step 100.

If the select completion flag F_SLF is reset (F_SLF=0) and thus the select operation is determined to be under execution, the control proceeds to step 101, where the target position scheduler 52 searches an NGEAR_cmd/Psl_cmd_table map, which is shown, and obtains a set value Psl_c-md_table of each gear position corresponding to NGEAR_cmd in the select direction.

The target position scheduler 52 holds the target value Psc_cmd of the shift arm 11 in the shift direction at the current value in the next step 102 and sets Psc_cmd_tmp for specifying an increment of the target value in the shift direction to zero in step 103. The next step 104 is processing to be performed by the VPOLE_sc calculating section 54 and the VPOLE_sl calculating section 61. The VPOLE_sl calculating section sets VPOLE_sl to VPOLE_sl_h (=−0.7) and the VPOLE_sc calculating section 54 sets VPOLE_sc to VPOLE_sc4 (=−0.9).

This reduces the disturbance-control capacities of the shift controller 50 and facilitates the shift arm 11 moving in the shift direction in the select operation. Therefore, even if interference occurs between the shift arm 11 and the shift piece 21, the select operation can be smoothly performed.

Thereafter, if an absolute value |Psl−Psl_cmd| of a difference between the current position and the target position of the shift arm 11 in the select direction is less than the select completion judgment value E_Pslf (for example, 0.15 mm) in step 105 and the traveling speed ΔPsl of the shift arm 11 in the select direction is less than the select speed convergence judgment value D_Pslf (for example, 0.1 mm/step) in step 106, the controller 1 determines that the select operation is completed and proceeds to step 107. The controller 1 then sets the select completion flag F_SLF (F_SLF=1) and proceeds to step 96 to terminate the "shift/select operation."

On the other hand, if the select completion flag F_SLF is set and thus the select operation is determined to be completed in step 100, the control branches to step 110. Steps 110 to 111 are processing to be performed by the target position scheduler 52. The target position scheduler 52 holds the target position Psl_cmd of the shift arm 11 in the shift direction at the current value in step 110 and executes a "calculation of a target value in the revolution synchronous operation" described later in step 111.

The next step 112 is processing to be performed by the VPOLE_sl calculating section 61. The VPOLE_sl calculating section 61 sets VPOLE_sl to VPOLE_sl_l (=−0.95). This reduces the disturbance-control capabilities of the select controller 51 and therefore, even if interference occurs between the shift arm 11 and the shift piece 21, the shift operation of the shift arm 11 can be smoothly performed. Then, the control proceeds from step 112 to step 96, where the controller 1 terminates the "shift/select operation."

Subsequently, referring to FIG. 9, there is shown a flowchart of the "calculation of a target value in the revolution synchronous operation" in step 111 shown in FIG. 8. Primarily the target position scheduler 52 executes the "calculation of a target value in the revolution synchronous operation."

The target position scheduler 52 searches the shown NGEAR_cmd/Psc_def,_scf,_end,_table map in step 120 to acquire a standby position Psc_def of the synchronizer ring in each of the transmission mechanisms 2a to 2c and the backward gear train 83, 85, and 86 corresponding to the gear selection target values NGEAR_cmd, a position Psc_scf (corresponding to a predetermined position of the present invention) for starting the revolution synchronous operation between the coupling sleeve and synchronized gears (the first forward gear 9a on the output side, the second forward gear 9b on the output side, the third forward gear 7c on the input side, the fourth forward gear 7d on the input side, the fifth forward gear 7e on the input side, the sixth forward gear 7f on the input side, the second backward gear 83, and the third backward gear 86), and an end position Psc_end of the shift operation.

In the subsequent step 121, the target position scheduler 52 acquires a displacement speed D_Psc_cmd_table of the shift operation depending on the gear selection target value NGEAT_cmd. The displacement speed D_Psc_cmd_table is changed according to a gear position in this manner, thereby preventing an occurrence of a shift shock in a low gear and a contact sound between the synchronizer ring and the coupling sleeve.

Then, in the next step 122, the target position scheduler 52 sets Psc_def_table, Psc_scf_table, Psc_end_table, and D_Psc_cmd_table acquired by means of the foregoing map search to corresponding target values Psc_def, Psc_scf, Psc_end, and D_Psc_cmd, respectively. Furthermore, in the subsequent step 123, it sets a middle target position Psc_cmd_tmp of the shift arm 11 in the shift operation.

Step 124 and after in FIG. 10 are processing in the foregoing mode 1 to mode 4. If the position Psc of the shift arm 11 in the shift direction does not exceed Psc_scf and thus the revolution synchronous operation between the coupling sleeve and the synchronizer ring is determined to be incomplete in step 124, the control proceeds to step 125.

In step 125, the controller 1 sets a mode 1/2 flag F_mode12 (F_mode12=1) indicating that processing in mode 1 or mode 2 is under execution. If the position Psc of the shift arm 11 in the shift direction does not exceed Psc_def, in other words, the shift arm 11 does not exceed the standby position of the synchronizer ring in the next step 126, the control proceeds to step 127.

Steps 127 and 128 are processing in mode 1. In step 127, the offset value determination section 55 resets an offset flag F_Ufb_OK (F_Ufb_OK=0) for specifying whether to add the offset value Ufb to the target position in the shift direction set by the target position scheduler 52 to inhibit the addition of the offset value Ufb. In the subsequent step 128, the VPOLE_sc calculating section 54 of the shift controller 50 sets VPOLE_sc to VPOLE_sc_11 (=−0.8). This enhances the disturbance-control capabilities of the shift controller 50 and thereby increases the compliance with the target position Psc_cmd.

If the middle target position Psc_cmd_tmp of the shift arm 11 in the shift operation exceeds the position Psc_scf where the revolution synchronous operation is started in step 129, the control branches to step 180, where the target position scheduler 52 sets Psc_scf to the target position Psc_cmd in the shift direction. Then, the control proceeds to step 131, where the "calculation of a target value in the revolution synchronous operation" is terminated. On the other hand, unless the middle target position Psc_cmd_tmp of the shift arm 11 in the shift operation exceeds the position Psc_scf where the revolution synchronous operation is started in step 129, the control proceeds to step 130, where the target position scheduler 52 sets the middle target position Psc_cmd_tmp of the shift arm 11 in the shift operation to the target position Psc_cmd in the shift direction. Then, the control proceeds to step 131, where the "calculation of a target value in the revolution synchronous operation" is terminated.

If the position Psc of the shift arm 11 in the shift direction exceeds Psc_def in step 126 and thus the shift arm 11 is determined to be in the standby position of the synchronizer ring in step 126, the control branches to step 160, where it is determined whether a variation ΔPsc of a position of the shift arm 11 in the shift direction exceeds the contact judgment value ΔPsc_sc between the coupling sleeve and the synchronizer ring.

If ΔPsc is less than ΔPsc_sc and the coupling sleeve has not contacted the synchronizer ring yet, the control proceeds to step 161. If ΔPsc exceeds ΔPsc_sc and the coupling sleeve has already contacted the synchronizer ring, the control branches to step 170. The arrangement for detecting whether the coupling sleeve is in contact with the synchronizer ring in step 126 and step 160 corresponds to contact detecting means of the present invention.

Steps 161 and 162 are processing in mode 1, in which the offset value determination section 55 resets the offset flag F_Ufb_OK (F_Ufb_OK=0) to inhibit the addition of the offset value Ufb. Then, in the subsequent step 162, the VPOLE_sc calculating section 54 sets VPOLE_sc to VPOLE_sc12 (=−0.98). This reduces the disturbance-control capabilities of the shift controller 50, thereby reducing a shock at the contact between the coupling sleeve and the synchronizer ring.

Steps 170 and 171 are processing in mode 2. The offset value determination section 55 sets the offset flag F_Ufb_OK (F_Ufb_OK=1) to permit the addition of the offset value Ufb in step 170. In the subsequent step 171, the VPOLE_sc calculating section 54 sets VPOLE_sc to VPOLE_sc2 (−0.85). This enhances the disturbance-control capabilities of the shift controller 50, by which an appropriate pressing force can be applied to the synchronizer ring so as to obtain a synchronization in the number of revolutions between the coupling sleeve and the synchronized gear.

Thereafter, the offset value determination section 55 calculates E_Ufb(k) and σ_Ufb(k) in the foregoing equations (16) and (17) in step 172 and calculates Uadp_Ufb(k), Urch_Ufb(k), and Ufb(k) in the foregoing equations (18), (19), and (20) in step 173. Then, in the next step 174, the adder 56 adds the offset value Ufb(k) to Psc_scf (corresponding to a pressing target position of the present invention) set by the target position scheduler 52, thereby setting the target position Psc_cmd in the shift direction. The control then proceeds to step 131 to terminate the "calculation of a target value in the revolution synchronous operation."

On the other hand, if the position Psc of the shift arm 11 in the shift direction exceeds Psc_scf in step 124 or the synchronization in the number of revolutions is obtained between the coupling sleeve and the synchronized gear in step 124, the control branches to step 140. Then, it is determined whether the mode 1/2 flag F_mode12 has been set in step 140.

If the mode 1/2 flag F_mode12 has been set (F_mode12=1) in step 140 or the processing in mode 1 or mode 2 is under execution, the control branches to step 150, where the controller 1 sets a mode 3 transition flag F_mode2to3 (F_mode2to3=1) and resets the mode 1/2 flag F_mode12 (F_mode12=0). The control then proceeds to step 142. On the other hand, if the mode 1/2 flag has been reset (F_mode12=0) in step 140 or the processing in mode 2 has already been completed, the control proceeds to step 141, where the controller 1 resets the mode 3 transition flag F_mode2to3 (F_mode2to3=0). Thereafter, the control proceeds to step 142.

In step 142, the offset value determination section 55 resets the offset flag F_Ufb_OK (F_Ufb_OK=0) to inhibit the addition of the offset value Ufb. In the subsequent step 143, the VPOLE_sc calculating section 54 of the shift controller 50 sets VPOLE_sc to VPOLE_sc3 (=−0.7). In the next step 144, the target position scheduler 52 sets the target value Psc_cmd of the shift arm 11 in the shift direction to Psc_end. This reduces the disturbance-control capabilities of the shift controller 50 and prevents the shift arm 11 from overrunning the shift completion position Psc_end. Thereafter, the control proceeds from step 144 to step 131, where the controller 1 terminates the "calculation of a target value in the revolution synchronous operation."

FIG. 11 is a graph showing a transition of the actual position Psc of the coupling sleeve when the target position Psc_cmd in the shift direction is augmented by setting the offset flag F_Ufb_OK (F_Ufb_OK=1) and adding the offset value Ufb in mode 2. The upper graph in FIG. 11 has an ordinate along which the actual position Psc of the coupling sleeve and the offset value Ufb are arranged and an abscissa along which a time axis is arranged. In FIG. 11, characters a, b, and c designate the target position Psc_cmd of the coupling sleeve, the actual position Psc of the coupling sleeve, and the offset value Ufb, respectively.

The lower graph has an ordinate along which set/reset levels of the offset flag F_Ufb_OK are arranged and an abscissa along which a time axis, which is the same as in the upper graph is arranged. In FIG. 11, character d designates a level of the offset flag F_Ufb_OK. In FIG. 11, $t_{10}$ indicates a time point when a contact between the coupling sleeve and the synchronizer ring is detected and the offset flag F_Ufb_OK is set (F_Ufb_OK=1) during the period of $t_{10}$ to $t_{11}$ in the lower graph.

Referring to the upper graph, it is understood that setting of the offset flag F_Ufb_OK starts the addition of the offset value Ufb and augments the target position Psc_cmd at $t_{10}$, which causes the coupling sleeve to be gently pressed into the synchronizer ring without being bounced against the synchronizer ring or without interruption of the shift of the coupling sleeve.

While the offset value determination section 55 has adopted the sliding mode control as the response specification type control of the present invention in this embodiment, a back stepping control or other types of response specification type controls can be used.

Furthermore, the description of the embodiment has been intended for the synchronization mechanism 2 in which the coupling sleeve 6 is arranged in the side of the input shaft 5 and the synchronized gear 7 is coupled to the drive shaft as shown in FIG. 1. The present invention, however, is also applicable to a synchronization mechanism in which a coupling sleeve is arranged in the side of an output shaft and a synchronized gear is coupled to an input shaft.

Still further, while the embodiment has been described by giving an example of an arrangement with the electric motors 12 and 13 used as actuators of the present invention, the present invention is also applicable to an arrangement with other types of electric actuators or a pneumatic or hydraulic actuator.

Moreover, while the present invention has been applied to the synchronization mechanism provided in the transmission 80 as the controller for the contact mechanism of the present invention in this embodiment, the present invention is not limited to them. For example, referring to FIG. 12, there is shown an example that the present invention is applied to a machine tool (corresponding to the contact mechanism of the present invention) for boring a work 100 (corresponding to the contacted member of the present invention) using an end mill 101 (corresponding to the contacting member of the present invention). The end mill 101 is attached to an elevating actuator 103 by means of a chuck 102.

As shown in FIG. 12, the boring processing can be classified into the following three processes in the same manner as for the foregoing control in mode 1 to mode 3 in the shift operation of the transmission 80:

Process 1: Bring an end of the end mill 101 to the work 100 in a short time until the end mill 101 contacts the work 100 and suppress the impact when the end mill 101 contacts the work 100.

Process 2: Cut the work 100 while applying a fixed pressing force (Fc) to the end mill 101.

Process 3: Stop a downward motion of the end mill 101 to prevent the chuck 102 from clashing the work 100. When boring the work 100 terminates and the end mill 101 receives no resistance from the work 100, the end mill 101 abruptly comes down.

Moreover, an actual position (Py) of the end mill 101 is replaced with the actual position (Psc) of the coupling sleeve 22 shown in FIG. 2(*a*) to set a changed position (Py_vp) of the compliance parameter (VPOLE) in the process 1 and a standby position (Py_def, which corresponds to Psc_def in the control of the shift operation of the transmission 80) of the work 100 or the like. Thereafter, the operation of the elevating actuator 103 is controlled, thereby reducing the time for boring and reducing the impact when the end mill 101 contacts the work 100.

Furthermore, the pressing force of the end mill 101 can be maintained at a predetermined target pressing force by preventing the end mill 101 from applying an excess pressing force to the work 100 and preventing a lack of the pressing force in the process 2. Thereafter, in the process 3, the end mill 101 can be stopped immediately.

What is claimed is:

1. A controller for a contact mechanism for performing a process of controlling an operation of the contact mechanism, which includes a contacting member provided so as to be movable in a one-axis direction, an actuator coupled to the contacting member and moving the contacting member, and a contacted member that contacts the contacting member when the contacting member moves to a predetermined position, in order to press the contacting member to the contacted member by moving the contacting member beyond the predetermined position by using the actuator, the controller comprising:

target position setting means for setting a target position of the contacting member in the process;

actual position grasping means for grasping an actual position of the contacting member;

control input determination means for determining a control input to the actuator so as to increase an output of the actuator along with an increase in a difference between the target position and the actual position of the contacting member to eliminate the difference; and contact detecting means for detecting that the contacting member contacts the contacted member, wherein the target position setting means sets the target position of the contacting member so that the control input to the actuator matches a target control input that causes the pressing force applied from the contacting member to the contacted member to be at a predetermined level when the contact detecting means detects that the contacting member contacts the contacted member.

2. The controller for the contact mechanism according to claim 1, wherein the target position setting means sets the target position of the contacting member by adding an offset value for increasing the difference to a pressing target position preset to a position beyond the predetermined position when the contact detecting means detects that the contacting member contacts the contacted member.

3. The controller for the contact mechanism according to claim 2, wherein:

the control input determination means determines the control input to the actuator for each predetermined control cycle; and the controller for the contact mechanism includes offset value determination means for determining the offset value by using a response specification type control in which a damping behavior and a damping speed of a difference between a control input to the actuator in past control cycles and the target control input to eliminate the difference therebetween.

4. The controller for the contact mechanism according to claim 2, wherein the target position setting means increases the difference by adding the offset value to the pressing target position until the actual position of the contacting member reaches a preset limiting position.

5. The controller for the contact mechanism according to claim 3, wherein the target position setting means increases the difference by adding the offset value to the pressing target position until the actual position of the contacting member reaches a preset limiting position.

6. The controller for the contact mechanism according to claim 1, wherein:

the contact mechanism is a synchronization mechanism for switching between transmission and disconnection of rotational power; and the contacting member is a first engaging member provided so as to be integrally rotatable on a shaft, and the contacted member is a synchronization member arranged between a second engaging member relatively rotatable and not axially movable on the shaft and the first engaging member in such a way as to be freely rotatable with respect to the first engaging member and the second engaging member and movable in an axial direction thereof and enables an engagement between the first engaging member and the second engaging member by synchronizing revolutions between the first engaging member and the second engaging member by means of a frictional force generated at a contact between the first engaging member and the second engaging member with the shaft being rotating.

* * * * *